United States Patent
Srinivasan et al.

(10) Patent No.: US 9,148,668 B2
(45) Date of Patent: *Sep. 29, 2015

(54) CODING OF MOTION VECTOR INFORMATION

(71) Applicant: Microsoft Technology Licensing, LLC, Redmond, WA (US)

(72) Inventors: Sridhar Srinivasan, Redmond, WA (US); Pohsiang Hsu, Redmond, WA (US); Thomas W. Holcomb, Bothell, WA (US); Kunal Mukerjee, Redmond, WA (US); Bruce Chih-Lung Lin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/180,276

(22) Filed: Feb. 13, 2014

(65) Prior Publication Data

US 2014/0161191 A1    Jun. 12, 2014

Related U.S. Application Data

(63) Continuation of application No. 13/455,094, filed on Apr. 24, 2012, now Pat. No. 8,687,697, which is a continuation of application No. 10/622,841, filed on Jul. 18, 2003.

(51) Int. Cl.
*H04N 7/12* (2006.01)
*H04N 11/02* (2006.01)
(Continued)

(52) U.S. Cl.
CPC ............... *H04N 19/137* (2014.11); *G06K 9/36* (2013.01); *G06K 9/46* (2013.01); *H04N 7/50* (2013.01);
(Continued)

(58) Field of Classification Search
CPC . H04N 7/50; H04N 7/26244; H04N 7/26271; H04N 7/30
USPC ........... 375/240.12–240.16, 240.23; 382/232, 382/239, 244–246
See application file for complete search history.

(56) References Cited

U.S. PATENT DOCUMENTS

| | | |
|---|---|---|
| 4,454,546 A | 6/1984 | Mori |
| 4,661,849 A | 4/1987 | Hinman |

(Continued)

FOREIGN PATENT DOCUMENTS

| | | |
|---|---|---|
| EP | 0 279 053 | 8/1988 |
| EP | 0 397 402 | 11/1990 |

(Continued)

OTHER PUBLICATIONS

U.S. Appl. No. 60/341,674, filed Dec. 17, 2001, Lee et al.

(Continued)

*Primary Examiner* — Chikaodili E Anyikire
(74) *Attorney, Agent, or Firm* — Judy Yee; Micky Minhas

(57) ABSTRACT

Techniques and tools for encoding and decoding motion vector information for video images are described. For example, a video encoder yields an extended motion vector code by jointly coding, for a set of pixels, a switch code, motion vector information, and a terminal symbol indicating whether subsequent data is encoded for the set of pixels. In another aspect, an encoder/decoder selects motion vector predictors for macroblocks. In another aspect, a video encoder/decoder uses hybrid motion vector prediction. In another aspect, a video encoder/decoder signals a motion vector mode for a predicted image. In another aspect, a video decoder decodes a set of pixels by receiving an extended motion vector code, which reflects joint encoding of motion information together with intra/inter-coding information and a terminal symbol. The decoder determines whether subsequent data exists for the set of pixels based on e.g., the terminal symbol.

20 Claims, 19 Drawing Sheets

Software 780 implementing video encoder or decoder

(51) Int. Cl.
  *H04N 11/04* (2006.01)
  *G06K 9/36* (2006.01)
  *G06K 9/46* (2006.01)
  *H04N 19/137* (2014.01)
  *H04N 19/61* (2014.01)
  *H04N 19/51* (2014.01)
  *H04N 19/513* (2014.01)
  *H04N 19/63* (2014.01)
  *H04N 19/91* (2014.01)
  *H04N 19/132* (2014.01)
  *H04N 19/139* (2014.01)
  *H04N 19/176* (2014.01)
  *H04N 7/52* (2011.01)

(52) U.S. Cl.
  CPC ............... *H04N 7/52* (2013.01); *H04N 19/132* (2014.11); *H04N 19/139* (2014.11); *H04N 19/176* (2014.11); *H04N 19/51* (2014.11); *H04N 19/513* (2014.11); *H04N 19/61* (2014.11); *H04N 19/63* (2014.11); *H04N 19/91* (2014.11)

(56) References Cited

U.S. PATENT DOCUMENTS

| | | |
|---|---|---|
| 4,661,853 A | 4/1987 | Roeder et al. |
| 4,691,329 A | 9/1987 | Juri et al. |
| 4,695,882 A | 9/1987 | Wada et al. |
| 4,796,087 A | 1/1989 | Guichard et al. |
| 4,800,432 A | 1/1989 | Barnett et al. |
| 4,849,812 A | 7/1989 | Borgers et al. |
| 4,862,267 A | 8/1989 | Gillard et al. |
| 4,864,393 A | 9/1989 | Harradine et al. |
| 4,999,705 A | 3/1991 | Puri |
| 5,021,879 A | 6/1991 | Vogel |
| 5,068,724 A | 11/1991 | Krause et al. |
| 5,089,887 A | 2/1992 | Robert et al. |
| 5,091,782 A | 2/1992 | Krause et al. |
| 5,103,306 A | 4/1992 | Weiman et al. |
| 5,105,271 A | 4/1992 | Niihara |
| 5,111,292 A | 5/1992 | Kuriacose et al. |
| 5,117,287 A | 5/1992 | Koike et al. |
| 5,144,426 A | 9/1992 | Tanaka et al. |
| 5,155,594 A | 10/1992 | Bernstein et al. |
| 5,157,490 A | 10/1992 | Kawai et al. |
| 5,175,618 A | 12/1992 | Ueda |
| 5,193,004 A | 3/1993 | Wang et al. |
| 5,223,949 A | 6/1993 | Honjo |
| 5,227,878 A | 7/1993 | Puri et al. |
| 5,258,836 A | 11/1993 | Murata |
| 5,274,453 A | 12/1993 | Maeda |
| 5,287,420 A | 2/1994 | Barrett |
| 5,298,991 A | 3/1994 | Yagasaki et al. |
| 5,317,397 A | 5/1994 | Odaka et al. |
| 5,319,463 A | 6/1994 | Hongu et al. |
| 5,343,248 A | 8/1994 | Fujinami |
| 5,347,308 A | 9/1994 | Wai |
| 5,376,968 A | 12/1994 | Wu et al. |
| 5,376,971 A | 12/1994 | Kadono et al. |
| 5,379,351 A | 1/1995 | Fandrianto et al. |
| 5,386,234 A | 1/1995 | Veltman et al. |
| 5,400,075 A | 3/1995 | Savatier |
| 5,412,430 A | 5/1995 | Nagata |
| 5,412,435 A | 5/1995 | Nakajima |
| RE34,965 E | 6/1995 | Sugiyama |
| 5,422,676 A | 6/1995 | Herpel et al. |
| 5,424,779 A | 6/1995 | Odaka |
| 5,426,464 A | 6/1995 | Casavant et al. |
| 5,428,396 A | 6/1995 | Yagasaki et al. |
| 5,442,400 A | 8/1995 | Sun |
| 5,448,297 A | 9/1995 | Alattar et al. |
| 5,453,799 A | 9/1995 | Yang et al. |
| 5,457,495 A | 10/1995 | Hartung |
| 5,461,421 A | 10/1995 | Moon |
| RE35,093 E | 11/1995 | Wang et al. |
| 5,465,118 A | 11/1995 | Hancock et al. |
| 5,467,086 A | 11/1995 | Jeong |
| 5,467,136 A | 11/1995 | Odaka |
| 5,477,272 A | 12/1995 | Zhang et al. |
| RE35,158 E | 2/1996 | Sugiyama |
| 5,491,523 A | 2/1996 | Sato |
| 5,493,514 A | 2/1996 | Keith et al. |
| 5,510,840 A | 4/1996 | Yonemitsu et al. |
| 5,517,327 A | 5/1996 | Nakatani et al. |
| 5,539,466 A | 7/1996 | Igarashi et al. |
| 5,544,286 A | 8/1996 | Laney |
| 5,546,129 A | 8/1996 | Lee |
| 5,550,541 A | 8/1996 | Todd |
| 5,550,847 A | 8/1996 | Zhu |
| 5,552,832 A | 9/1996 | Astle |
| 5,565,922 A | 10/1996 | Krause |
| 5,574,504 A | 11/1996 | Yagasaki et al. |
| 5,594,504 A | 1/1997 | Ebrahimi |
| 5,594,813 A | 1/1997 | Fandrianto et al. |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,648,819 A | 7/1997 | Tranchard |
| 5,650,829 A | 7/1997 | Sugimoto et al. |
| 5,654,771 A | 8/1997 | Tekalp et al. |
| 5,659,365 A | 8/1997 | Wilkinson |
| 5,666,461 A | 9/1997 | Igarashi et al. |
| 5,668,608 A | 9/1997 | Lee |
| 5,668,932 A | 9/1997 | Laney |
| 5,673,339 A | 9/1997 | Lee |
| 5,687,097 A | 11/1997 | Mizusawa et al. |
| 5,689,305 A | 11/1997 | Ng et al. |
| 5,689,306 A | 11/1997 | Jung |
| 5,692,063 A | 11/1997 | Lee et al. |
| 5,694,173 A | 12/1997 | Kimura et al. |
| 5,699,117 A | 12/1997 | Uramoto et al. |
| 5,699,476 A | 12/1997 | Van Der Meer |
| 5,701,164 A | 12/1997 | Kato |
| 5,715,005 A | 2/1998 | Masaki |
| 5,717,441 A | 2/1998 | Serizawa et al. |
| 5,731,850 A | 3/1998 | Maturi et al. |
| 5,734,783 A | 3/1998 | Shimoda et al. |
| 5,748,784 A | 5/1998 | Sugiyama |
| 5,748,789 A | 5/1998 | Lee et al. |
| 5,767,898 A | 6/1998 | Urano et al. |
| 5,784,175 A | 7/1998 | Lee |
| 5,786,860 A | 7/1998 | Kim et al. |
| 5,787,203 A | 7/1998 | Lee et al. |
| 5,793,897 A | 8/1998 | Jo et al. |
| 5,796,855 A | 8/1998 | Lee |
| 5,799,113 A | 8/1998 | Lee |
| RE35,910 E | 9/1998 | Nagata et al. |
| 5,825,830 A | 10/1998 | Kopf |
| 5,825,929 A | 10/1998 | Chen et al. |
| 5,835,144 A | 11/1998 | Matsumura et al. |
| 5,835,146 A | 11/1998 | Stone |
| 5,835,149 A | 11/1998 | Astle |
| 5,844,613 A | 12/1998 | Chaddha |
| 5,847,776 A | 12/1998 | Khmelnitsky et al. |
| 5,859,668 A | 1/1999 | Aono et al. |
| 5,874,995 A | 2/1999 | Naimpally et al. |
| 5,901,248 A | 5/1999 | Fandrianto et al. |
| 5,905,535 A | 5/1999 | Kerdranvat |
| 5,905,542 A | 5/1999 | Linzer |
| 5,923,375 A | 7/1999 | Pau |
| 5,926,573 A | 7/1999 | Kim et al. |
| 5,929,940 A | 7/1999 | Jeannin |
| 5,946,042 A | 8/1999 | Kato |
| 5,946,043 A | 8/1999 | Lee et al. |
| 5,949,489 A | 9/1999 | Nishikawa et al. |
| 5,959,673 A | 9/1999 | Lee et al. |
| 5,963,258 A | 10/1999 | Nishikawa et al. |
| 5,963,259 A | 10/1999 | Nakaya et al. |
| 5,963,673 A | 10/1999 | Kodama et al. |

(56) References Cited

U.S. PATENT DOCUMENTS

| | | |
|---|---|---|
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,982,437 A | 11/1999 | Okazaki et al. |
| 5,982,438 A | 11/1999 | Lin et al. |
| 5,990,960 A | 11/1999 | Murakami et al. |
| 5,991,447 A | 11/1999 | Eifrig et al. |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl et al. |
| 6,026,195 A | 2/2000 | Eifrig et al. |
| 6,035,070 A | 3/2000 | Moon et al. |
| 6,040,863 A | 3/2000 | Kato |
| 6,052,150 A | 4/2000 | Kikuchi |
| 6,057,884 A | 5/2000 | Chen |
| 6,058,212 A | 5/2000 | Yokohama |
| 6,067,322 A | 5/2000 | Wang |
| 6,081,209 A | 6/2000 | Schuyler et al. |
| 6,094,225 A | 7/2000 | Han |
| RE36,822 E | 8/2000 | Sugiyama |
| 6,097,759 A | 8/2000 | Murakami et al. |
| 6,111,914 A | 8/2000 | Bist |
| 6,130,963 A | 10/2000 | Uz et al. |
| 6,148,027 A | 11/2000 | Song et al. |
| 6,148,033 A | 11/2000 | Pearlstein et al. |
| 6,154,495 A | 11/2000 | Yamaguchi et al. |
| 6,167,090 A | 12/2000 | Iizuka |
| 6,188,725 B1 | 2/2001 | Sugiyama |
| 6,188,794 B1 | 2/2001 | Nishikawa et al. |
| 6,201,927 B1 | 3/2001 | Comer |
| 6,205,176 B1 | 3/2001 | Sugiyama |
| 6,208,761 B1 | 3/2001 | Passaggio et al. |
| 6,215,905 B1 | 4/2001 | Lee et al. |
| 6,219,070 B1 | 4/2001 | Baker et al. |
| 6,219,464 B1 | 4/2001 | Greggain et al. |
| 6,233,017 B1 | 5/2001 | Chaddha |
| 6,236,806 B1 | 5/2001 | Kojima et al. |
| RE37,222 E | 6/2001 | Yonemitsu |
| 6,243,418 B1 | 6/2001 | Kim |
| 6,259,741 B1 | 7/2001 | Chen et al. |
| 6,263,024 B1 | 7/2001 | Matsumoto |
| 6,263,065 B1 | 7/2001 | Durinovic-Johri et al. |
| 6,266,091 B1 | 7/2001 | Saha et al. |
| 6,271,885 B2 | 8/2001 | Sugiyama |
| 6,272,179 B1 | 8/2001 | Kadono |
| 6,275,528 B1 | 8/2001 | Isozaki et al. |
| 6,275,531 B1 | 8/2001 | Li |
| 6,281,942 B1 | 8/2001 | Wang |
| 6,282,243 B1 | 8/2001 | Kazui et al. |
| 6,289,049 B1 | 9/2001 | Kim et al. |
| 6,289,132 B1 | 9/2001 | Goertzen |
| 6,292,585 B1 | 9/2001 | Yamaguchi et al. |
| 6,295,376 B1 | 9/2001 | Nakaya |
| 6,307,887 B1 | 10/2001 | Gabriel |
| 6,307,973 B2 | 10/2001 | Nishikawa et al. |
| 6,310,918 B1 | 10/2001 | Saha et al. |
| 6,320,593 B1 | 11/2001 | Sobel et al. |
| 6,324,216 B1 | 11/2001 | Igarashi |
| 6,337,881 B1 | 1/2002 | Chaddha |
| 6,339,656 B1 | 1/2002 | Marui |
| 6,377,628 B1 | 4/2002 | Schultz et al. |
| 6,381,275 B1 | 4/2002 | Fukuhara et al. |
| 6,381,277 B1 | 4/2002 | Chun et al. |
| 6,381,279 B1 | 4/2002 | Taubman |
| 6,393,059 B1 | 5/2002 | Sugiyama |
| 6,396,876 B1 | 5/2002 | Babonneau et al. |
| 6,404,813 B1 | 6/2002 | Haskell et al. |
| 6,408,029 B1 | 6/2002 | McVeigh et al. |
| 6,418,166 B1 | 7/2002 | Wu et al. |
| 6,421,383 B2 | 7/2002 | Beattie |
| 6,430,316 B1 | 8/2002 | Wilkinson |
| 6,441,842 B1 | 8/2002 | Fandrianto et al. |
| 6,442,204 B1 | 8/2002 | Snook et al. |
| 6,449,312 B1 | 9/2002 | Zhang et al. |
| 6,483,928 B1 | 11/2002 | Bagni et al. |
| 6,493,392 B1 | 12/2002 | Chung et al. |
| 6,496,608 B1 | 12/2002 | Chui |
| 6,498,810 B1 | 12/2002 | Kim et al. |
| 6,519,005 B2 | 2/2003 | Bakhmutsky et al. |
| 6,519,287 B1 | 2/2003 | Hawkins et al. |
| 6,529,632 B1 | 3/2003 | Nakaya et al. |
| 6,539,056 B1 | 3/2003 | Sato et al. |
| 6,563,953 B2 | 5/2003 | Lin et al. |
| 6,647,061 B1 | 11/2003 | Panusopone et al. |
| 6,650,781 B2 | 11/2003 | Nakaya |
| 6,661,470 B1 | 12/2003 | Kawakami et al. |
| 6,671,323 B1 | 12/2003 | Tahara et al. |
| 6,704,360 B2 | 3/2004 | Haskell et al. |
| 6,728,317 B1 | 4/2004 | Demos |
| RE38,563 E | 8/2004 | Eifrig et al. |
| 6,778,610 B2 | 8/2004 | Lin |
| 6,782,053 B1 | 8/2004 | Lainema |
| 6,842,219 B2 | 1/2005 | Lee |
| 6,950,469 B2 | 9/2005 | Karczewicz et al. |
| 6,968,008 B1 | 11/2005 | Ribas-Corbera et al. |
| 6,980,596 B2 | 12/2005 | Wang et al. |
| 6,983,018 B1 | 1/2006 | Lin et al. |
| 7,020,200 B2 | 3/2006 | Winger |
| 7,023,919 B2 | 4/2006 | Cho et al. |
| 7,233,621 B2 | 6/2007 | Jeon |
| 7,295,616 B2 | 11/2007 | Sun et al. |
| 7,317,839 B2 | 1/2008 | Holcomb |
| 7,453,941 B1 | 11/2008 | Yamori et al. |
| 7,486,734 B2 * | 2/2009 | Machida ............... 375/240.25 |
| 7,567,617 B2 | 7/2009 | Holcomb |
| 7,616,692 B2 | 11/2009 | Holcomb et al. |
| 7,623,574 B2 | 11/2009 | Holcomb |
| 7,630,438 B2 | 12/2009 | Mukerjee et al. |
| 7,742,529 B1 | 6/2010 | Ghanbari |
| 7,822,120 B2 | 10/2010 | Kondo et al. |
| 8,155,188 B2 | 4/2012 | Abe et al. |
| 2001/0019586 A1 | 9/2001 | Kang et al. |
| 2001/0050957 A1 | 12/2001 | Nakaya et al. |
| 2002/0106025 A1 | 8/2002 | Tsukagoshi et al. |
| 2002/0122488 A1 | 9/2002 | Takahashi et al. |
| 2002/0186890 A1 | 12/2002 | Lee et al. |
| 2003/0059118 A1 | 3/2003 | Suzuki |
| 2003/0072374 A1 | 4/2003 | Sohm |
| 2003/0076883 A1 | 4/2003 | Bottreau et al. |
| 2003/0095603 A1 | 5/2003 | Lan et al. |
| 2003/0099292 A1 | 5/2003 | Wang et al. |
| 2003/0099294 A1 | 5/2003 | Wang et al. |
| 2003/0112864 A1 | 6/2003 | Karczewicz et al. |
| 2003/0113026 A1 | 6/2003 | Srinivasan et al. |
| 2003/0142748 A1 | 7/2003 | Tourapis et al. |
| 2003/0152146 A1 | 8/2003 | Lin et al. |
| 2003/0156646 A1 | 8/2003 | Hsu et al. |
| 2003/0161402 A1 | 8/2003 | Horowitz |
| 2003/0179826 A1 | 9/2003 | Jeon |
| 2003/0202705 A1 | 10/2003 | Sun |
| 2004/0057523 A1 | 3/2004 | Koto et al. |
| 2004/0136461 A1 | 7/2004 | Kondo et al. |
| 2005/0013497 A1 | 1/2005 | Hsu et al. |
| 2005/0013498 A1 | 1/2005 | Srinivasan |
| 2005/0036700 A1 | 2/2005 | Nakaya |
| 2005/0036759 A1 | 2/2005 | Lin et al. |
| 2005/0053137 A1 | 3/2005 | Holcomb |
| 2005/0053147 A1 | 3/2005 | Mukerjee et al. |
| 2005/0053149 A1 | 3/2005 | Mukerjee et al. |
| 2005/0053292 A1 | 3/2005 | Mukerjee et al. |
| 2005/0058205 A1 | 3/2005 | Holcomb et al. |
| 2005/0100093 A1 | 5/2005 | Holcomb |
| 2005/0226335 A1 | 10/2005 | Lee et al. |
| 2006/0013307 A1 | 1/2006 | Olivier et al. |

FOREIGN PATENT DOCUMENTS

| | | |
|---|---|---|
| EP | 0 526 163 | 2/1993 |
| EP | 0 535 746 | 4/1993 |
| EP | 0 540 350 | 5/1993 |
| EP | 0 542 474 | 5/1993 |
| EP | 0 588 653 | 3/1994 |

(56) References Cited

FOREIGN PATENT DOCUMENTS

| | | |
|---|---|---|
| EP | 0 614 318 | 9/1994 |
| EP | 0 625 853 | 11/1994 |
| EP | 0 651 574 | 5/1995 |
| EP | 0 676 900 | 10/1995 |
| EP | 0 771 114 | 5/1997 |
| EP | 0 786 907 | 7/1997 |
| EP | 0 825 778 | 2/1998 |
| EP | 0 830 029 | 3/1998 |
| EP | 0 884 912 | 12/1998 |
| EP | 0 944 245 | 9/1999 |
| EP | 1 335 609 | 8/2003 |
| EP | 1 411 729 | 4/2004 |
| GB | 2328337 | 2/1999 |
| GB | 2332115 | 6/1999 |
| GB | 2343579 | 5/2000 |
| JP | 61205086 | 9/1986 |
| JP | 62 213 494 | 9/1987 |
| JP | 3001688 | 1/1991 |
| JP | 3 129 986 | 3/1991 |
| JP | 05-199422 | 8/1993 |
| JP | 6 078 295 | 3/1994 |
| JP | 6 078 298 | 3/1994 |
| JP | 06-276481 | 9/1994 |
| JP | 06-276511 | 9/1994 |
| JP | 6292188 | 10/1994 |
| JP | 07-087331 | 3/1995 |
| JP | 7-274171 | 10/1995 |
| JP | 08-140099 | 5/1996 |
| JP | 09-322163 | 12/1997 |
| JP | 10 056 644 | 2/1998 |
| JP | 10-271512 | 10/1998 |
| JP | 2001-346215 | 12/2001 |
| JP | 2004-048711 | 2/2004 |
| JP | 2004-215229 | 7/2004 |
| WO | WO 98/44743 | 10/1998 |
| WO | WO 00/33581 | 8/2000 |
| WO | WO 03/026296 | 3/2003 |
| WO | WO 03/026315 | 3/2003 |
| WO | WO 03/047272 | 6/2003 |
| WO | WO 03/063503 | 7/2003 |

OTHER PUBLICATIONS

U.S. Appl. No. 60/488,710, filed Jul. 18, 2003, Srinivasan et al.
U.S. Appl. No. 60/501,081, Sep. 7, 2003, Srinivasan et al.
U.S. Appl. No. 60/501,133, Sep. 7, 2003, Holcomb et al.
Bartkowiak et al., "Color Video Compression Based on Chrominance Vector Quantization," 7th Int'l Workshop on Systems, Signals and Image Processing, *IWSSIP 2000*, Maribor 7-9 VI, pp. 107-110 (Jun. 2000).
Benzler et al., "Improving multiresolution motion compensating hybrid coding by drift reduction," *Picture Coding Symposium*, 4 pp. (Mar. 1996).
Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp. (document marked Dec. 1995).
Benzler, "Results of core experiments P8 (Motion and Aliasing Compensating Prediction)," ISO/IEC JTC1/SC29/WG11, MPEG 97/2625, 8 pp. (document marked Oct. 1997).
Borman et al., "Block-matching Sub-pixel Motion Estimation from Noisy, Under-Sampled Frames—an Empirical Performance Evaluation," *SPIE Visual Comm. & Image Processing*, 10 pp. (Jan. 1999).
Conklin et al., "Multi-resolution Motion Estimation," *Proc. ICASSP '97*, Munich, Germany, 4 pp. (Apr. 1997).
Davis et al., "Equivalence of subpixel motion estimators based on optical flow and block matching," *Proc. IEEE Int'l Symposium on Computer Vision*, pp. 7-12 (Nov. 1995).
de Haan et al., "Sub-pixel motion estimation with 3-D recursive search block-matching," *Signal Processing: Image Comm.* 6, pp. 229-239 (Jun. 1994).
"DivX Multi Standard Video Encoder," 2 pp. (Downloaded from the World Wide Web on Jan. 24, 2006).

Ericsson, "Fixed and Adaptive Predictors for Hybrid Predictive/Transform Coding," *IEEE Transactions on Comm.*, vol. COM-33, No. 12, pp. 1291-1302 (Dec. 1985).
Flierl et al., "Multihypothesis Motion Estimation for Video Coding," *Proc. DCC*, 10 pp. (Mar. 2001).
Fogg, "Survey of Software and Hardware VLC Architectures," *SPIE*, vol. 2186, pp. 29-37 (Feb. 9-10, 1994).
Girod, "Efficiency Analysis of Multihypothesis Motion-Compensated Prediction for Video Coding," *IEEE Transactions on Image Processing*, vol. 9, No. 2, pp. 173-183 (Feb. 2000).
Girod, "Motion-Compensating Prediction with Fractional-Pel Accuracy," *IEEE Transactions on Comm.*, vol. 41, No. 4, pp. 604-612 (Apr. 1993).
Girod, "Motion Compensation: Visual Aspects, Accuracy, and Fundamental Limits," *Motion Analysis and Image Sequence Processing*, Kluwer Academic Publishers, pp. 125-152 (Mar. 1993).
Horn et al., "Estimation of Motion Vector Fields for Multiscale Motion Compensation," *Proc. Picture Coding Symp. (PCS 97)*, pp. 141-144 (Sep. 1997).
Hsu et al., "A Low Bit-Rate Video Codec Based on Two-Dimensional Mesh Motion Compensation with Adaptive Interpolation," *IEEE Transactions on Circuits and Systems for Video Technology*, vol. II, No. 1, pp. 111-117 (Jan. 2001).
Huang et al., "Hardware architecture design for variable block size motion estimation in MPEG-4 AVC/JVT/ITU-T H.264," Proc. of the 2003 Int'l Symposium on Circuits & Sys. (ISCAS '03), vol. 2, pp. 796-799 (May 2003).
IBM Technical Disclosure Bulletin, "Advanced Motion Estimation for Moving Picture Expert Group Encoders," vol. 39, No. 4, pp. 323-324 (Apr. 1996).
International Organization for Standardisation, ISO/IEC JTC1/SC29/WG11, MPEG 92/535, AVC-356, Coded Representation of Picture and Audio Information, "Draft Proposal for Test Model 2, revision 2," Experts group on ATM Video Coding, Oct. 1992, 84 pages.
ISO/IEC, "Information Technology—Coding of Audio-Visual Objects: Visual, ISO/IEC 14496-2, Committee Draft," 330 pp. (Mar. 1998).
ISO/IEC, "MPEG-4 Video Verification Model Version 10.0," ISO/IEC JTC1/SC29/WG11, MPEG98/N1992, (ed. Ebrahimi) (document marked Feb. 1998).
ISO/IEC, "ISO/IEC 11172-2, Information Technology—Coding of Moving Pictures and Associated Audio for Digital Storage Media at up to about 1.5 Mbit/s—Part 2: Video," 112 pp. (Aug. 1993).
ISO/IEC, "ISO/IEC CD 13818-2: Information technology—Generic coding of moving pictures and associated audio information—Part 2: video," ISO/IEC JTC1/SC29 N659, 189 pp. (Dec. 1993).
ISO/IEC, "Draft Text of Final Draft International Standard for Advanced Video Coding (ITU-T Rec. H.264 | ISO/IEC 14496-10 AVC)," ISO/IEC JTC 1/Sc 29/WG 11 N5555, 242 pp. (Mar. 2003).
ISO/IEC, "Text of Committee Draft of Joint Video Specification (ITU-T Rec. H.264 | ISO/IEC 14496-10 AVC," ISO/IEC JTC1/SC29/WG11 MPEG02/N4810, 143 pp. (May 2002).
ISO/IEC, "MPEG-4 Video Verification Model Version 7.1," ISO/IEC JTC1/SC29/WG11 MPEG97/M2249, 204 pp. (Ed. Ebrahimi) (Stockholm, Jul. 13, 1997).
ISO/IEC, "Draft of 14496-2 Third Edition, Information Technology—Coding of Audio-Visual Objects—Part 2: Visual," ISO/IEC JTC 1/SC 29/WG 11 M9477, 590 pp. (Pattaya, Mar. 3, 2003).
ITU-T, "ITU-T Recommendation H.261, Video Codec for Audiovisual Services at $p \times 64$ kbits," 25 pp. (Mar. 1993).
ITU-T, "ITU-T Recommendation H.262, Information Technology—Generic Coding of Moving Pictures and Associated Audio Information: Video," 205 pp. (Jul. 1995).
ITU-T, "ITU-T Recommendation H.263 Video Coding for Low Bit Rate Communication," 167 pp. (Feb. 1998).
ITU—Q15-F-24, "MVC Video Codec—Proposal for H.26L," Study Group 16, Video Coding Experts Group (Question 15), 28 pp. (document marked as generated in Oct. 1998).
ITU (Kerofsky et al.), "Adaptive Syntax for MTYPE", Study Group 16, Question 6, Video Coding Experts Group (VCEG), VCEG-M14, 13th Meeting: Austin, Texas, Apr. 2-4, 2001, 6 pages.

(56) References Cited

OTHER PUBLICATIONS

ITU (Sullivan and Wiegand), Meeting Report of the Thirteenth Meeting (Meeting M) of the ITU-T Video Coding Experts Group (VCEG), [Q.6/16]—Austin, Texas, Apr. 2-4, 2001, 34 pages.

ITU-T, "H.26L Test Model Long Term No. 5 (TML-5) draft0," Study Group 16, Video Coding Experts Group (Question 15), Document Q15-K-59, 35 pp. (ed. Gisle Bjontegaard) (Document dated Oct. 2000).

ITU-T, "Adaptive Field/Frame Block Coding Experiment Proposal," Study Group 16, Video Coding Experts Group (VCEG), VCEG-N76, Santa Barbara Meeting, Sep. 24-27, 2001.

ITU (Borgwardt), "Core Experiment on Interlaced Video Coding," Study Group 16, Question 6, Video Coding Experts Group (VCEG), VCEG-N85r1, 14th Meeting: Santa Barbara, California, Sep. 24-27, 2001, 10 pages.

ITU (Borgwardt), "Core Experiment on Interlaced Video Coding," Study Group 16, Question 6, Video Coding Experts Group (VCEG), VCEG-059, 15th Meeting: Pattaya, Thailand, Dec. 4-6, 2001, 10 pages.

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Jang et al., "MPEG-4 Version 2 Visual Working Draft Rev 5.1," ISO/IEC JTC1/SC29 WG11 M4257, 462 pp. (Dec. 1998).

Jeong et al., "Adaptive Huffman Coding of 2-D DCT Coefficients for Image Sequence Compression," *Signal Processing: Image Communication*, vol. 7, 11 pp. (Mar. 1995).

Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001) [document marked "Generated: Jan. 18, 2002"].

Joint Video Team (JVT) of ISO/IEC MPEG and ITU-T VCEG, "Joint Committee Draft (CD)," JVT-C167, 3rd Meeting: Fairfax, Virginia, USA, 142 pp. (May 2002).

Joint Video Team (JVT) of ISO/IEC MPEG and ITU-T VCEG, "Final Joint Committee Draft of Joint Video Specification (ITU-T Recommendation H.264, ISO/IEC 14496-10 AVC," JVT-D157, 218 pp. (Aug. 2002).

Joint Video Team (JVT) of ISO/IEC MPEG & ITU-T VCEG (Tourapis), Direct Prediction for Predictive (P) and Bidirectionally Predictive (B) frames in Video Coding, JVT-C128 (ISO/IEC JTC1/SC29/WG11 and ITU-T SG16 Q.6), 3rd Meeting: Fairfax, Virginia, USA, 12 pages, May 6-10, 2002.

Joint Video Team (JVT) of ISO/IEC MPEG & ITU-T VCEG (Tourapis), "Timestamp Independent Motion Vector Prediction for P and B frames with Division Elimination," JVT-D040 (ISO/IEC JTC1/SC29/WG11 and ITU-T SG16 Q.6), 4th Meeting: Klagenfurt, Austria, Jul. 22-26, 2002, 18 pages.

Joint Video Team (JVT) of ISO/IEC JTC1/SC29/WG11 and ITU-T SG.16 (Jeon and Tourapis), "B Pictures in JVT," JVT-D155, JVT Meeting, MPEG Meeting, Klagenfurt, Austria, Jul. 22-26, 2002, 19 pages.

Joint Video Team (JVT) of ISO/IEC MPEG & ITU-T VCEG (Borgwardt), "Core Experiment on Macroblock Adaptive Frame/Field Encoding," JVT-B117 (ISO/IEC JTC1/SC29/WG11 and ITU-T SG16 Q.6), 2nd Meeting: Geneva, Switzerland, Jan. 29-Feb. 1, 2002, 8 pages.

Joint Video Team (JVT) of ISO/IEC MPEG & ITU-T VCEG (Kondo), "Memory Reduction for Temporal Technique of Direct Mode," JVT-E076 (ISO/IEC JTC1/SC29/WG11 and ITU-T SG16 Q.6), 5th Meeting: Geneva, Switzerland, Oct. 9-17, 2002, 12 pages.

Keys, "Cubic Convolution Interpolation for Digital Image Processing," *IEEE Transactions on Acoustics, Speech & Signal Processing*, vol. ASSP-29, No. 6, pp. 1153-1160 (Dec. 1981).

Konrad et al., "On Motion Modeling and Estimation for Very Low Bit Rate Video Coding," *Visual Comm. & Image Processing (VCIP '95)*, 12 pp. (May 1995).

Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lopes et al., "Analysis of Spatial Transform Motion Estimation with Overlapped Compensation and Fractional-pixel Accuracy," *IEEE Proc. Visual Image Signal Processing*, vol. 146, No. 6, pp. 339-344 (Dec. 1999).

Melanson, "VP3 Bitstream Format and Decoding Process," v0.5, 21 pp. (document marked Dec. 8, 2004).

Microsoft Corp., "Microsoft Debuts New Windows Media Player 9 Series, Redefining Digital Media on the PC," 4 pp. (document marked Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

Morimoto et al., "Fast Electronic Digital Image Stabilization," *Proc. ICPR*, Vienna, Austria, 5 pp. (Aug. 1996).

Odaka et al., "A motion compensated prediction method for interlaced image 'Dual-prime'," Information Processing Society of Japan (IPSJ) Technical Report, vol. 94, No. 53 (94-AVM-5), pp. 17-24, Jun. 24, 1994.

On2 Technologies Inc., "On2 Introduces TrueMotion VP3.2," 1 pp., press release dated Aug. 16, 2000 (downloaded from the World Wide Web on Dec. 6, 2012).

"Overview of MPEG-2 Test Model 5," 5 pp. [Downloaded from the World Wide Web on Mar. 1, 2006].

Patel et al., "Performance of a Software MPEG Video Decoder," *Proc. of the First ACM Intl Conf on Multimedia*, pp. 75-82 (Aug. 1993).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Ribas-Corbera et al., "On the Optimal Block Size for Block-based Motion-Compensated Video Coders," *SPIE Proc. of Visual Comm. & Image Processing*, vol. 3024, 12 pp. (Jan. 1997).

Ribas-Corbera et al., "On the Optimal Motion Vector Accuracy for Block-based Motion-Compensated Video Coders," *Proc. SPIE Digital Video Compression*, San Jose, CA, 13 pp. (Mar. 1996).

Schultz et al., "Subpixel Motion Estimation for Super-Resolution Image Sequence Enhancement," *Journal of Visual Comm. & Image Representation*, vol. 9, No. 1, pp. 38-50 (Mar. 1998).

Srinivasan et al., "Windows Media Video 9: overview and applications," Signal Processing: Image Communication, vol. 19, No. 9, pp. 851-875 (Oct. 2004).

Suhring et al., "JM2.1 video coding reference software, extract from source code module lencod.c," <http://iphome.hhi.de/suehring/tml/download/old_jm/jm21.zip>, May 27, 2002, 8 pages.

Sullivan et al., "The H.264/AVC Advanced Video Coding Standard: Overview and Introduction to the Fidelity Range Extensions," 21 pp. (Aug. 2004).

Sun et al., "Improved TML Loop Filter with Lower Complexity," ITU-T VCEG-N17, 8 pp. (Aug. 2001).

"The TML Project Web-Page and Archive," (including pages of code marked "image.cpp for H.26L decoder, Copyright 1999" and "image.c"), 24 pp. [Downloaded from the World Wide Web on Jun. 1, 2005].

Tourapis et al., "Predictive Motion Vector Field Adaptive Search Technique (PMVFAST)—Enhancing Block Based Motion Estimation," *Proc. Visual Communications and Image Processing*, 10 pp. (Jan. 2001).

Triggs, "Empirical Filter Estimation for Subpixel Interpolation and Matching," *Int'l Conf. Computer Vision '01*, Vancouver, Canada, 8 pp. (Jul. 2001).

Triggs, "Optimal Filters for Subpixel Interpolation and Matching," *Int'l Conf. Computer Vision '01*, Vancouver, Canada, 10 pp. (Jul. 2001).

"Video Coding Using Wavelet Decomposition for Very Low Bit-Rate Networks," 16 pp. (Month unknown 1997).

Wang et al., "Interlace Coding Tools for H.26L Video Coding," ITU-T SG16/Q.6 VCEG-O37, pp. 1-20 (Dec. 2001).

Wedi, "Complexity Reduced Motion Compensated Prediction with 1/8-pel Displacement Vector Resolution," ITU Study Group 16, Video Coding Experts Group (Question 6), Document VCEG-L20, 8 pp. (Document dated Dec. 2000).

(56) References Cited

OTHER PUBLICATIONS

Weiss et al., "Real Time Implementation of Subpixel Motion Estimation for Broadcast Applications," pp. 7/1-7/3 (Oct. 1990).

Wiegand, "H.26L Test Model Long-Term No. 9 (TML-9) draft 0," ITU-Telecommunications Standardization Sector, Study Group 16, VCEG-N83, 74 pp. (Dec. 2001).

Wiegand et al., "Long-term Memory Motion Compensated Prediction," *IEEE Transactions on Circuits & Systems for Video Technology*, vol. 9, No. 1, pp. 70-84 (Feb. 1999).

Wien, "Variable Block-Size Transforms for Hybrid Video Coding," Dissertation, 182 pp. (Feb. 2004).

Wikipedia, "Theora," 10 pp. (downloaded from the World Wide Web on Dec. 6, 2012).

Wikipedia, "VP3," 4 pp. (downloaded from the World Wide Web on Dec. 6, 2012).

Wu et al., "Joint estimation of forward and backward motion vectors for interpolative prediction of video," *IEEE Transactions on Image Processing*, vol. 3, No. 5, pp. 684-687 (Sep. 1994).

Xiph.org Foundation, "Theora I Specification," 206 pp. (Sep. 17, 2004).

Xiph.org Foundation, "Theora Specification," 206 pp. (Aug. 5, 2009).

Yang et al., "Very High Efficiency VLSI Chip-pair for Full Search Block Matching with Fractional Precision," *Proc. ICASSP/IEEE Int'l Conf. on Acoustics, Speech & Signal Processing*, Glasgow, pp. 2437-2440 (May 1989).

Yu et al., "Two-Dimensional Motion Vector Coding for Low Bitrate Videophone Applications," *Proc. Int'l Conf. on Image Processing*, Los Alamitos, US, pp. 414-417, IEEE Comp. Soc. Press (Oct. 1995).

Zhang et al., "Adaptive Field/Frame Selection for High Compression Coding," MERL TR-2003-29, 13 pp. (Jan. 2003).

Zhu, "RTP Payload Format for H.263 Video Streams," *IETF Request for Comments 2190*, 12 pp. (Sep. 1997).

\* cited by examiner

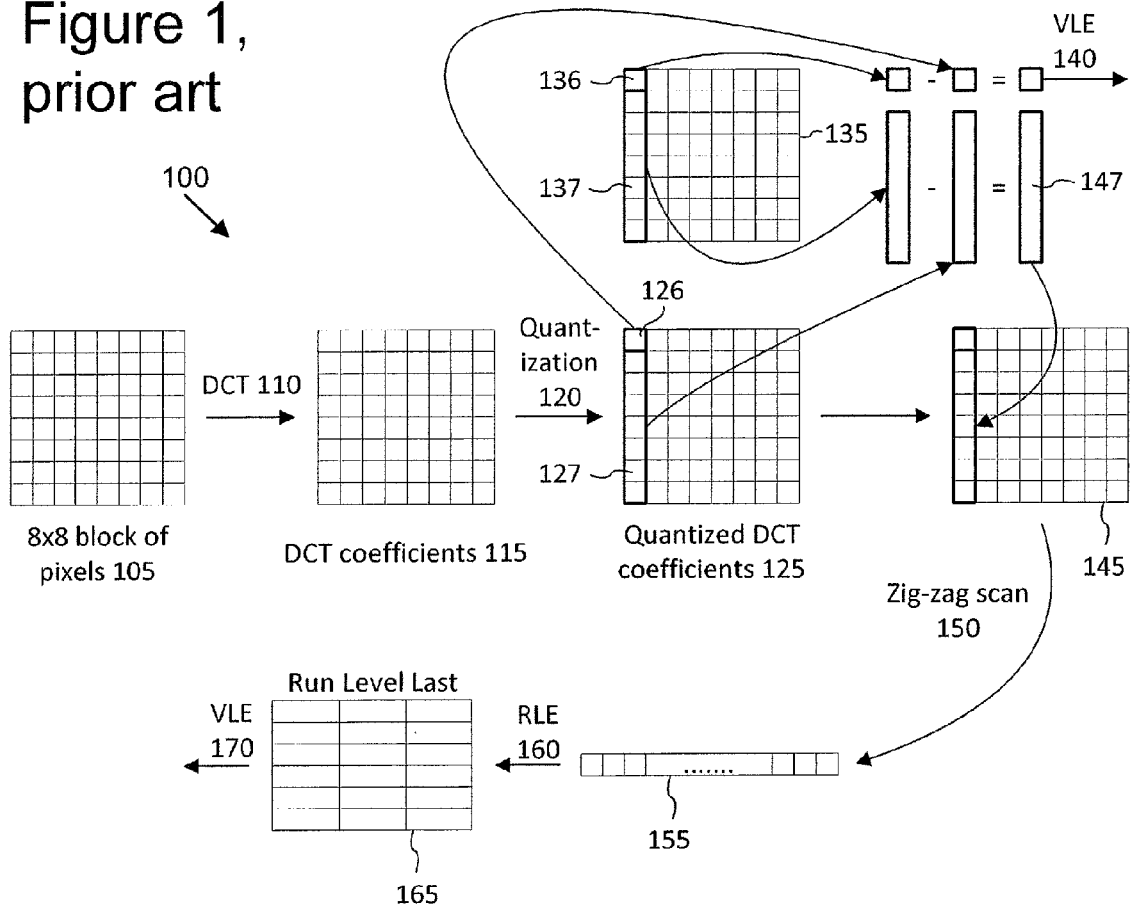
Figure 1, prior art
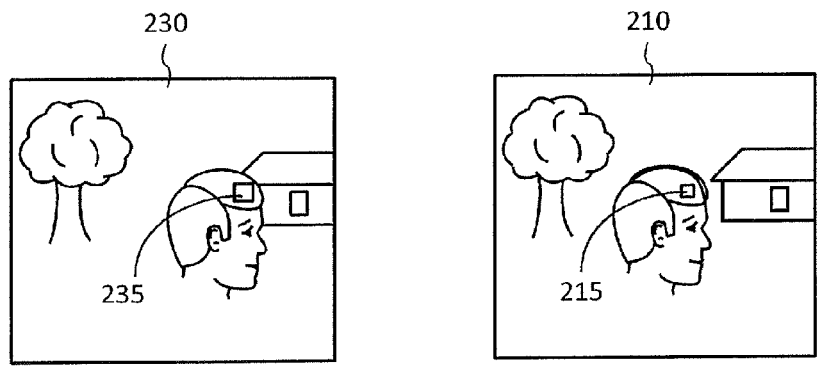
Figure 2, prior art

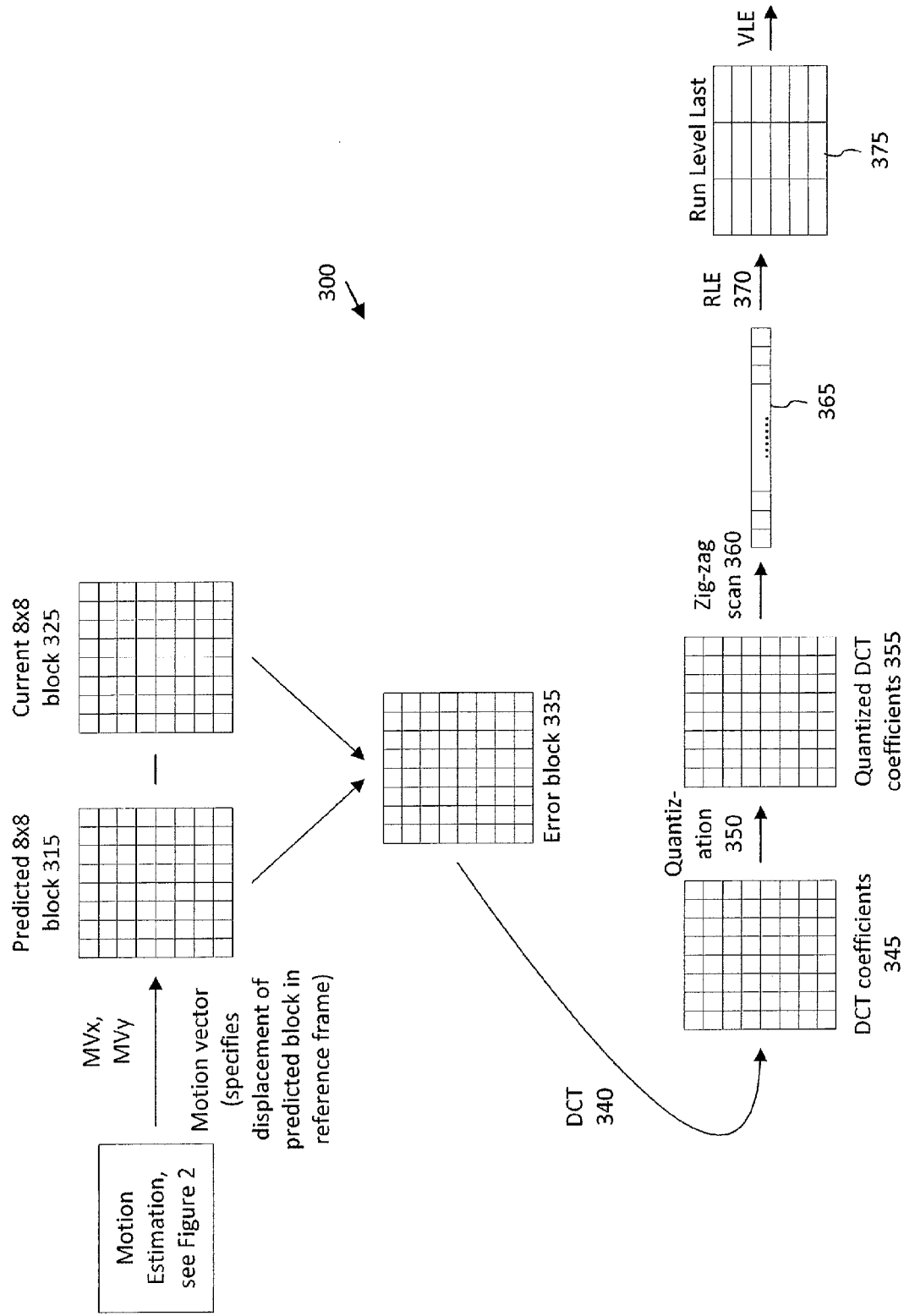

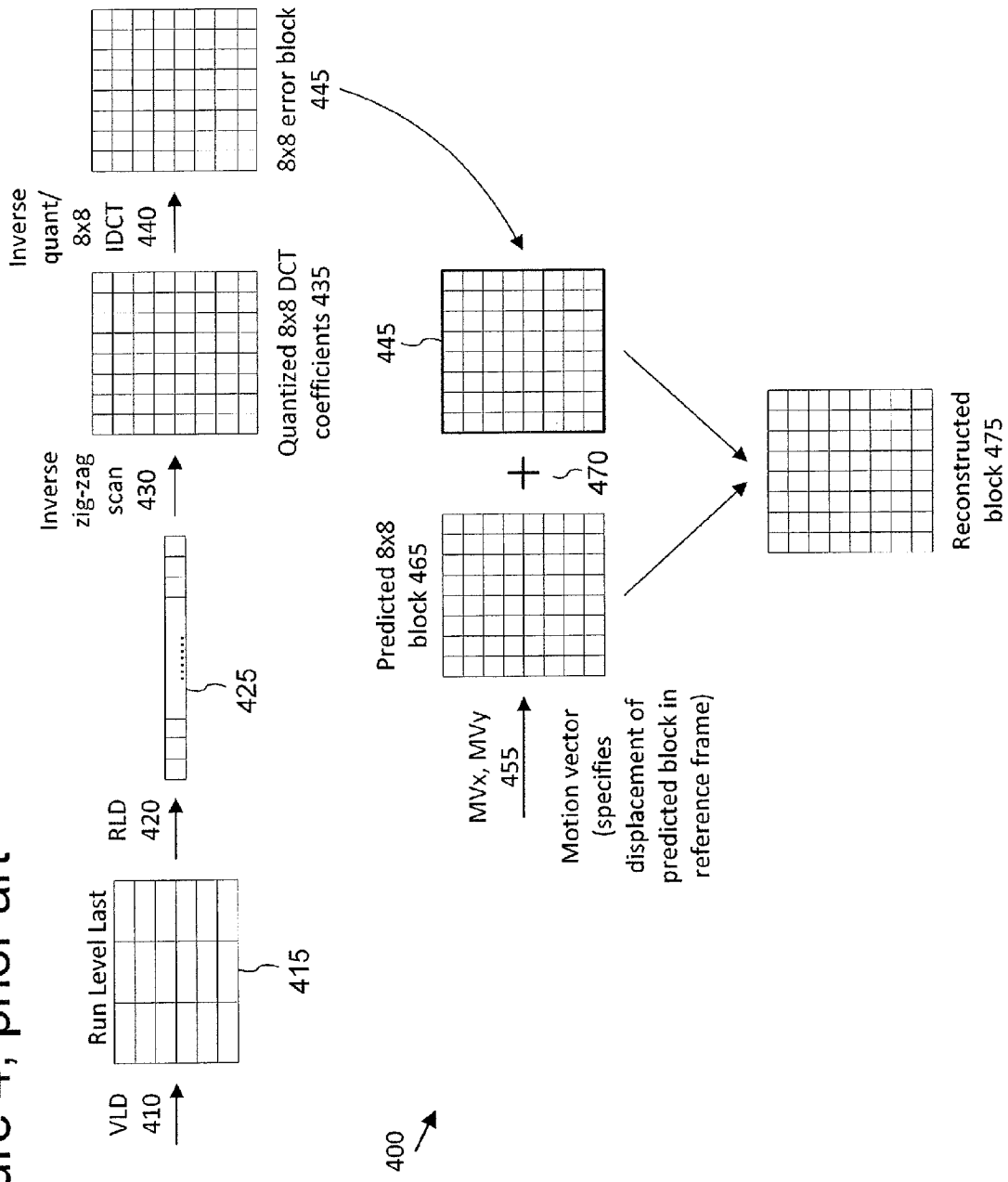
Figure 4, prior art

Figure 5, prior art
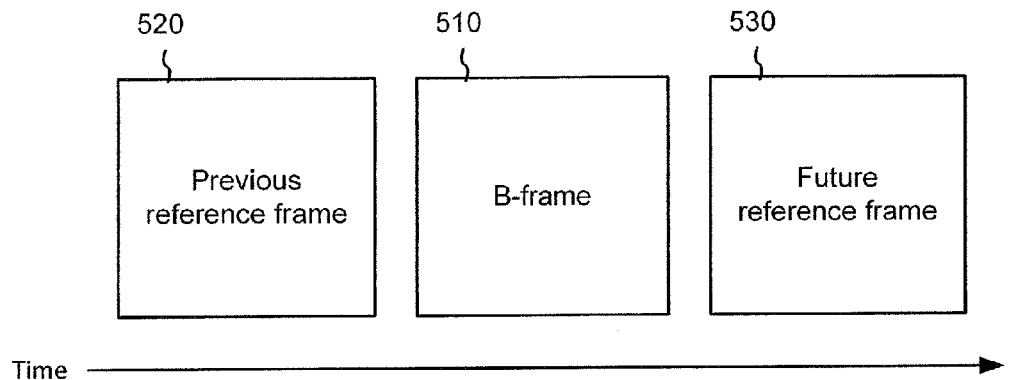
Figure 6, prior art
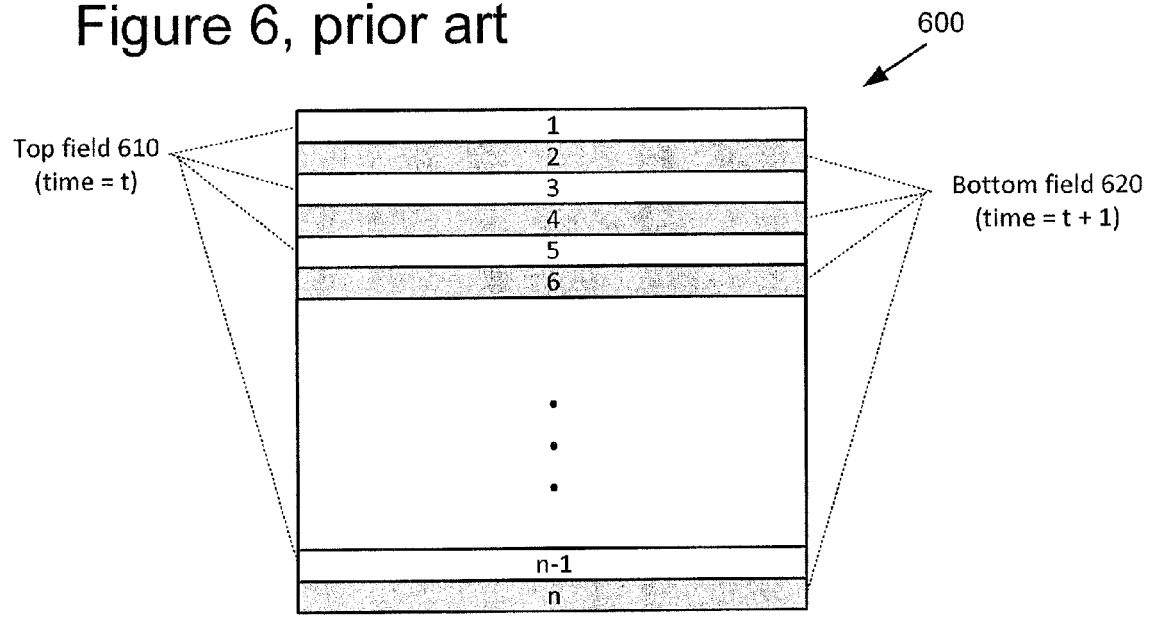

Figure 22A

| Predictor A (If field coded, predictor is averaged) | Predictor B (If field coded, predictor is averaged) |
|---|---|
| Predictor C (If field coded, predictor is averaged) | Current frame macroblock (not last in row) |

| Predictor B (If field coded, predictor is averaged) | Predictor A (If field coded, predictor is averaged) |
|---|---|
| Predictor C (If field coded, predictor is averaged) | Current frame macroblock (last in row) |

| Top field predictor A | Top field predictor B |
|---|---|
| Bottom field predictor A | Bottom field predictor B |
| Top field predictor C | Current top field |
| Bottom field predictor C | Curr. bottom field |

| Top field predictor B | Top field predictor A |
|---|---|
| Bottom field predictor B | Bottom field predictor A |
| Top field predictor C | Current top field |
| Bottom field predictor C | Curr. bottom field |

2310

CODING OF MOTION VECTOR INFORMATION

RELATED APPLICATION INFORMATION

The present application is a continuation of U.S. patent application Ser. No. 13/455,094, entitled "Coding of Motion Vector Information," filed Apr. 24, 2012, which is a continuation of U.S. patent application Ser. No. 10/622,841, entitled "Coding of Motion Vector Information," filed Jul. 18, 2003, the disclosures of which are hereby incorporated by reference. The following U.S. patent applications relate to the present application and are hereby incorporated herein by reference: 1) U.S. patent application Ser. No. 10/622,378, entitled, "Advanced Bi-Directional Predictive Coding of Video Frames," filed Jul. 18, 2003, now U.S. Pat. No. 7,609,763; 2) U.S. patent application Ser. No. 10/622,284, entitled, "Intraframe and Interframe Interlace Coding and Decoding," filed Jul. 18, 2003, now U.S. Pat. No. 7,426,308; 3) U.S. patent application Ser. No. 10/321,415, entitled, "Skip Macroblock Coding," filed Dec. 16, 2002, now U.S. Pat. No. 7,200,275; and 4) U.S. patent application Ser. No. 10/379,615, entitled "Chrominance Motion Vector Rounding," filed Mar. 4, 2003, now U.S. Pat. No. 7,116,831.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

Techniques and tools for coding and decoding motion vector information are described. A video encoder uses an extended motion vector in a motion vector syntax for encoding predicted video frames.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include intraframe compression and interframe compression. Intraframe compression techniques compress individual frames, typically called I-frames or key frames. Interframe compression techniques compress frames with reference to preceding and/or following frames, which are typically called predicted frames, P-frames, or B-frames.

Microsoft Corporation's Windows Media Video, Version 8 ["WMV8"] includes a video encoder and a video decoder. The WMV8 encoder uses intraframe and interframe compression, and the WMV8 decoder uses intraframe and interframe decompression.

A. Intraframe Compression in WMV8

FIG. 1 illustrates block-based intraframe compression 100 of a block 105 of pixels in a key frame in the WMV8 encoder. A block is a set of pixels, for example, an 8×8 arrangement of pixels. The WMV8 encoder splits a key video frame into 8×8 blocks of pixels and applies an 8×8 Discrete Cosine Transform ["DCT"] 110 to individual blocks such as the block 105. A DCT is a type of frequency transform that converts the 8×8 block of pixels (spatial information) into an 8×8 block of DCT coefficients 115, which are frequency information. The DCT operation itself is lossless or nearly lossless.

The encoder then quantizes 120 the DCT coefficients, resulting in an 8×8 block of quantized DCT coefficients 125. For example, the encoder applies a uniform, scalar quantization step size to each coefficient. Quantization is lossy. The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1 shows a neighbor block 135 that is situated to the left of the block being encoded in the frame.) The encoder entropy encodes 140 the differential.

The entropy encoder can encode the left column or top row of AC coefficients as a differential from a corresponding column or row of the neighboring 8×8 block. FIG. 1 shows the left column 127 of AC coefficients encoded as a differential 147 from the left column 137 of the neighboring (to the left) block 135. The differential coding increases the chance that the differential coefficients have zero values. The remaining AC coefficients are from the block 125 of quantized DCT coefficients.

The encoder scans 150 the 8×8 block 145 of predicted, quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

B. Interframe Compression in WMV8

Interframe compression in the WMV8 encoder uses block-based motion compensated prediction coding followed by transform coding of the residual error. FIGS. 2 and 3 illustrate the block-based interframe compression for a predicted frame in the WMV8 encoder. In particular, FIG. 2 illustrates motion estimation for a predicted frame 210 and FIG. 3 illustrates compression of a prediction residual for a motion-estimated block of a predicted frame.

For example, the WMV8 encoder splits a predicted frame into 8×8 blocks of pixels. Groups of four 8×8 blocks form macroblocks. For each macroblock, a motion estimation process is performed. The motion estimation approximates the motion of the macroblock of pixels relative to a reference frame, for example, a previously coded, preceding frame. In FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. After the encoder finds a good matching macroblock, the encoder outputs information specifying the motion vector (entropy coded) for the matching macroblock so the decoder can find the matching macroblock during decoding. When decoding the predicted frame 210 with motion compensation, a decoder uses the motion vector to compute a prediction macroblock for the macroblock 215 using information from the reference frame 230. The prediction for the macroblock 215 is rarely perfect, so the encoder usually encodes 8×8 blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355. The quantization step size is adjustable. Quantization results in loss of precision, but not complete loss of the information for the coefficients.

The encoder then prepares the 8×8 block 355 of quantized DCT coefficients for entropy encoding. The encoder scans 360 the 8×8 block 355 into a one dimensional array 365 with 64 elements, such that coefficients are generally ordered from lowest frequency to highest frequency, which typically creates long runs of zero values.

The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. Due to the quantization of the DCT coefficients, the reconstructed block 475 is not identical to the corresponding original block. The compression is lossy.

In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425 storing the entropy-decoded information into a two-dimensional block 435. The decoder inverse quantizes and inverse discrete cosine transforms (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475.

The amount of change between the original and reconstructed frame is termed the distortion and the number of bits required to code the frame is termed the rate for the frame. The amount of distortion is roughly inversely proportional to the rate. In other words, coding a frame with fewer bits (greater compression) will result in greater distortion, and vice versa.

C. Bi-Directional Prediction

Bi-directionally coded images (e.g., B-frames) use two images from the source video as reference (or anchor) images. For example, referring to FIG. 5, a B-frame 510 in a video sequence has a temporally previous reference frame 520 and a temporally future reference frame 530.

Some conventional encoders use five prediction modes (forward, backward, direct, interpolated and intra) to predict regions in a current B-frame. In intra mode, an encoder does not predict a macroblock from either reference image, and therefore calculates no motion vectors for the macroblock. In forward and backward modes, an encoder predicts a macroblock using either the previous or future reference frame, and therefore calculates one motion vector for the macroblock. In direct and interpolated modes, an encoder predicts a macroblock in a current frame using both reference frames. In interpolated mode, the encoder explicitly calculates two motion vectors for the macroblock. In direct mode, the encoder derives implied motion vectors by scaling the co-located motion vector in the future reference frame, and therefore does not explicitly calculate any motion vectors for the macroblock.

D. Interlace Coding

A typical interlace video frame consists of two fields scanned at different times. For example, referring to FIG. 6, an interlace video frame 600 includes top field 610 and bottom field 620. Typically, the odd-numbered lines (top field) are scanned at one time (e.g., time t) and the even-numbered lines (bottom field) are scanned at a different (typically later) time (e.g., time t+1). This arrangement can create jagged tooth-like features in regions of a frame where motion is present because the two fields are scanned at different times. On the other hand, in stationary regions, image structures in the frame may be preserved (i.e., the interlace artifacts visible in motion regions may not be visible in stationary regions). Macroblocks in interlace frames can be field-coded or frame-coded. In field-coded macroblocks, the top-field lines and bottom-field lines are rearranged, such that the top field lines appear at the top of the macroblock, and the bottom field lines appear at the bottom of the macroblock. Predicted field-coded macroblocks typically have one motion vector for each field in the macroblock. In frame-coded macroblocks, the field lines alternate between top-field lines and bottom-field lines. Predicted frame-coded macroblocks typically have one motion vector for the macroblock.

E. Standards for Video Compression and Decompression

Aside from WMV8, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV8, these standards use a combination of intraframe and interframe compression.

For example, advanced video compression or encoding techniques (including techniques in the MPEG, H.26x and WMV8 standards) are based on the exploitation of temporal coherence of typical video sequences. Image areas are tracked as they move over time, and information pertaining to the motion of these areas is compressed as part of the bit stream. Traditionally, a standard P-frame is encoded by computing and storing motion information in the form of two-dimensional displacement vectors corresponding to regularly-sized image tiles (e.g., macroblocks) For example, a macroblock may have one motion vector (a 1MV macroblock) for the macroblock or a motion vector for each of four blocks in the macroblock (a 4MV macroblock). Subsequently, the difference between the input frame and its motion compensated prediction is compressed, usually in a suitable transform domain, and added to an encoded bit stream. Typically, the motion vector component of the bitstream makes up between 10% and 30% of the size. Therefore, it can be appreciated that efficient motion vector coding is a key factor in efficient video compression.

Motion vector coding efficiency can be achieved in different ways. For example, motion vectors are often highly correlated between neighboring macroblocks. For efficiency, a motion vector of a given macroblock can be differentially coded from its prediction based on a causal neighborhood of adjacent macroblocks. A few exceptions to this general rule are observed in prior algorithms, such as those described in MPEG-4 and WMV8:

1. When the predicted motion vector lies outside a certain area (typically ±16 pixels from zero, for either component), the prediction is pulled back to the nearest point within this area.
2. When the vectors making up the causal neighborhood of the current macroblock are diverse (e.g., at motion discontinuities), the "Hybrid Motion Vector" mode is employed—the prediction is signaled by a codeword that indicates whether to use the motion vector to the top or to the left (or any other combination).
3. When a macroblock is essentially unchanged from its reference frame (i.e., a (0, 0) motion vector (no motion) and no residual components), it is indicated as being "skipped."
4. A macroblock may be coded as intra (i.e., not differentially predicted from the previous frame). In this case, no motion vector is sent. (Otherwise, for non-skipped macroblocks that are not intra coded, a motion vector is always sent.)
5. Intra coded macroblocks are indicated by an "I/P switch", which is jointly coded with a coded block pattern (or CBP). The CBP indicates which of the blocks making up a macroblock have attached residual information.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

In summary, the detailed description is directed to various techniques and tools for encoding and decoding motion vector information for video images. The various techniques and tools can be used in combination or independently.

In one aspect, a video encoder jointly codes for a set of pixels (e.g., block, macroblock, etc.) a switch code with motion vector information (e.g., a motion vector for an inter-coded block/macroblock, or a pseudo motion vector for an intra-coded block/macroblock). The switch code indicates whether a set of pixels is intra-coded.

In another aspect, a video encoder yields an extended motion vector code by jointly coding for a set of pixels a switch code, motion vector information, and a terminal symbol indicating whether subsequent data is encoded for the set of pixels. The subsequent data can include coded block pattern data and/or residual data for macroblocks. The extended motion vector code can be included in an alphabet or table of codes. In one aspect, the alphabet lacks a code that would represent a skip condition for the set of pixels.

In another aspect, an encoder/decoder selects motion vector predictors for current macroblocks (e.g., 1MV or mixed 1MV/4MV macroblocks) in a video image (e.g., an interlace or progressive P-frame or B-frame).

For example, an encoder/decoder selects a predictor from a set of candidates for a last macroblock of a macroblock row. The set of candidates comprises motion vectors from a set of macroblocks adjacent to the current macroblock. The set of macroblocks adjacent to the current macroblock consists of a top adjacent macroblock, a left adjacent macroblock, and a top-left adjacent macroblock. The predictor can be a motion vector for an individual block within a macroblock.

As another example, an encoder/decoder selects a predictor from a set of candidates comprising motion vectors from a set of blocks in macroblocks adjacent to a current macroblock. The set of blocks consists of a bottom-left block of a top adjacent macroblock, a top-right block of a left adjacent macroblock, and a bottom-right block of a top-left adjacent macroblock.

As another example, an encoder/decoder selects a predictor for a current top-left block in the first macroblock of a macroblock row from a set of candidates. The set of candidates comprises a zero-value motion vector and motion vectors from a set of blocks in an adjacent macroblock. The set of blocks consists of a bottom-left block of a top adjacent macroblock, and a bottom-right block of the top adjacent macroblock.

As another example, an encoder/decoder selects a predictor for a current top-right block of a current macroblock from a set of candidates. The current macroblock is the last macroblock of a macroblock row, and the set of candidates consists of a motion vector from the top-left block of the current macroblock, a motion vector from a bottom-left block of a top adjacent macroblock, and a motion vector from a bottom-right block of the top adjacent macroblock.

In another aspect, a video encoder/decoder calculates a motion vector predictor for a set of pixels (e.g., a 1MV or mixed 1MV/4MV macroblock) based on analysis of candidates, and compares the calculated predictor with one or more of the candidates (e.g., the left and top candidates). Based on the comparison, the encoder/decoder determines whether to replace the calculated motion vector predictor with a hybrid motion vector of one of the candidates. The set of pixels can be a skipped set of pixels (e.g., a skipped macroblock). The hybrid motion vector can be indicated by an indicator bit.

In another aspect, a video encoder/decoder selects a motion vector mode for a predicted image from a set of modes comprising a mixed one- and four-motion vector, quarter-pixel resolution, bicubic interpolation filter mode; a one-motion vector, quarter-pixel resolution, bicubic interpolation filter mode; a one-motion vector, half-pixel resolution, bicubic interpolation filter mode; and a one-motion vector, half-pixel resolution, bilinear interpolation filter mode. The mode can be signaled in a bit stream at various levels (e.g., frame-level, slice-level, group-of-pictures level, etc.). The set of modes also can include other modes, such as a four-motion vector, ⅛-pixel, six-tap interpolation filter mode.

In another aspect, for a set of pixels, a video encoder finds a motion vector component value and a motion vector predictor component value, each within a bounded range. The encoder calculates a differential motion vector component value (which is outside the bounded range) based on the motion vector component value and the motion vector predictor component value. The encoder represents the differential motion vector component value with a signed binary code in a bit stream. The signed binary code is operable to allow reconstruction of the differential motion vector component value. For example, the encoder performs rollover arithmetic to convert the differential motion vector component value into a signed binary code. The number of bits in the signed binary code can vary based on motion data (e.g., motion vector component direction (x or y), motion vector resolution, motion vector range).

In another aspect, a video decoder decodes a set of pixels in an encoded bit stream by receiving an extended motion vector code for the set of pixels. The extended motion vector code reflects joint encoding of motion information together with information indicating whether the set of pixels is intra-coded or inter-coded and with a terminal symbol. The decoder determines whether subsequent data for the set of pixels is included in the encoded bit stream based on the extended motion vector code (e.g., by the terminal symbol in the code). For a macroblocks (e.g., 4:2:0, 4:1:1, or 4:2:2 macroblocks), subsequent data can include a coded block pattern code and/or residual information for one or more blocks in the macroblock.

In the bit stream, the extended motion vector code can be preceded by, for example, header information or a modified coded block pattern code, and can be followed by other information for the set of pixels, such as a coded block pattern code. The decoder can receive more than one extended motion vector code for a set of pixels. For example, the decoder can receive two such codes for a bi-directionally predicted, or field-coded interlace macroblock. Or, the decoder can receive an extended motion vector code for each block in a macroblock.

In another aspect, a computer system includes means for decoding images, which comprises means for receiving an extended motion vector code and means for determining whether subsequent data for the set of pixels is included in the encoded bit stream based at least in part upon the received extended motion vector code.

In another aspect, a computer system includes means for encoding images, which comprises means for sending an extended motion vector code for a set of pixels as part of an encoded bit stream.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to the prior art.

FIG. 2 is a diagram showing motion estimation in a video encoder according to the prior art.

FIG. 3 is a diagram showing block-based interframe compression for an 8×8 block of prediction residuals in a video encoder according to the prior art.

FIG. 4 is a diagram showing block-based interframe decompression for an 8×8 block of prediction residuals in a video encoder according to the prior art.

FIG. 5 is a diagram showing a B-frame with past and future reference frames according to the prior art.

FIG. 6 is a diagram showing an interlaced video frame according to the prior art.

FIGS. 22A and 22B are diagrams showing candidate motion vector predictors for a frame-type macroblock in an interlace P-frame.

FIGS. 23A and 23B are diagrams showing candidate motion vector predictors for a field-type macroblock in an interlace P-frame.

DETAILED DESCRIPTION

The present application relates to techniques and tools for coding motion information in video image sequences. Bit stream formats or syntaxes include flags and other codes to incorporate the techniques. Different bit stream formats can comprise different layers or levels (e.g., sequence level, frame/picture/image level, macroblock level, and/or block level).

The various techniques and tools can be used in combination or independently. Different embodiments implement one or more of the described techniques and tools.

I. Computing Environment

Figure 7:
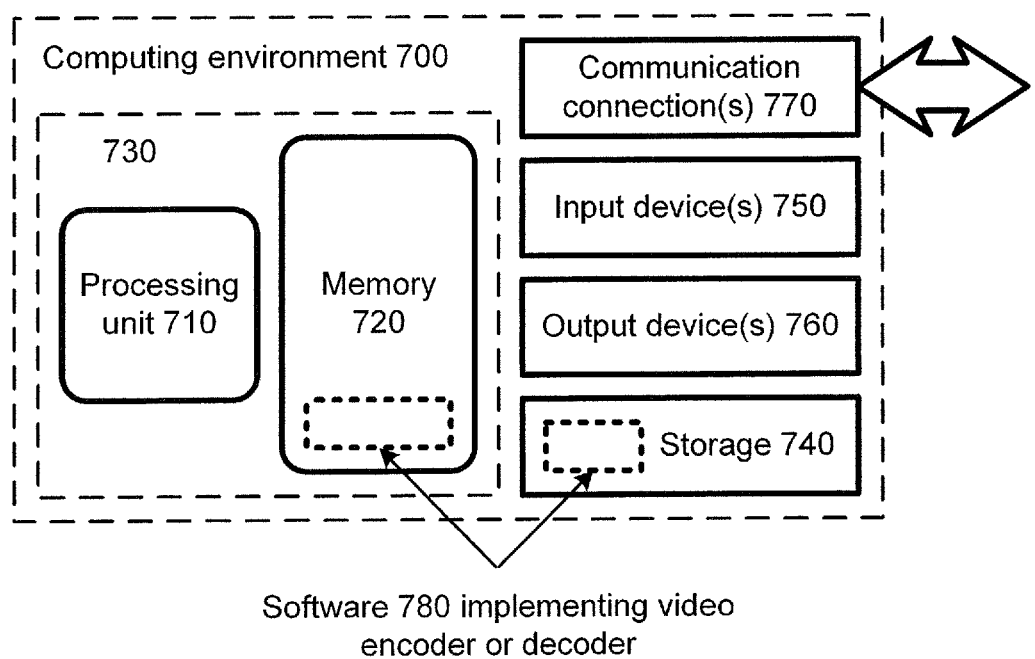
FIG. 7 is a block diagram of a suitable computing environment in which several described embodiments may be implemented.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing a video encoder or decoder.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder or decoder.

The input device(s) 750 may be a touch input device such as a keyboard, mouse, pen, or trackball, a voice input device, a scanning device, or another device that provides input to the computing environment 700. For audio or video encoding, the input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "predict," "choose," "compensate," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 8:
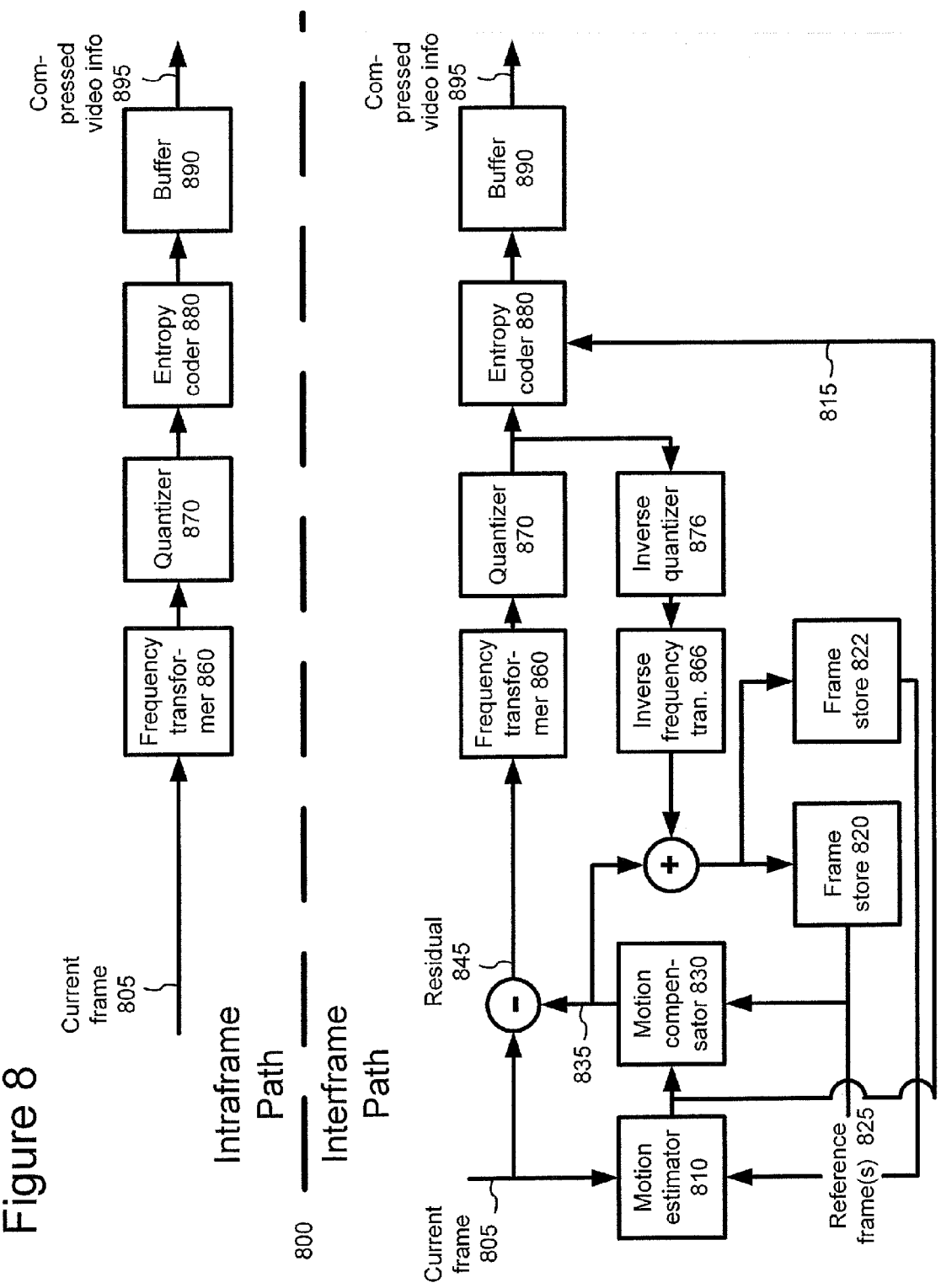
FIG. 8 is a block diagram of a generalized video encoder system used in several described embodiments.
Figure 9:
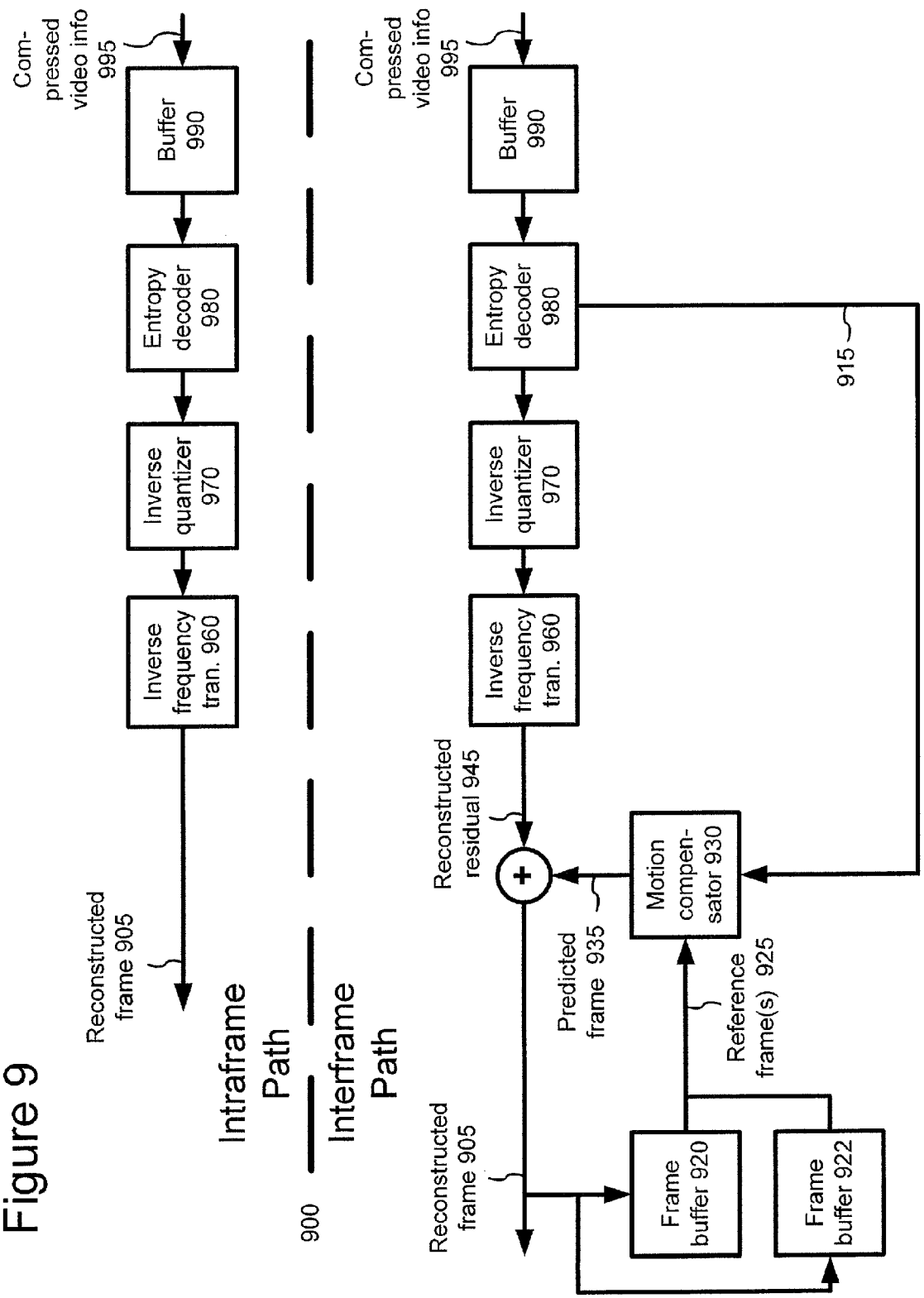
FIG. 9 is a block diagram of a generalized video decoder system used in several described embodiments.

FIG. 8 is a block diagram of a generalized video encoder 800 and FIG. 9 is a block diagram of a generalized video decoder 900.

The relationships shown between modules within the encoder and decoder indicate the main flow of information in the encoder and decoder; other relationships are not shown for the sake of simplicity. In particular, FIGS. 8 and 9 generally do not show side information indicating the encoder settings, modes, tables, etc. used for a video sequence, frame, macroblock, block, etc. Such side information is sent in the output bit stream, typically after entropy encoding of the side information. The format of the output bit stream can be a Windows Media Video format or another format.

The encoder 800 and decoder 900 are block-based and use a 4:2:0 macroblock format with each macroblock including four 8×8 luminance blocks and two 8×8 chrominance blocks, or a 4:1:1 macroblock format with each macroblock including four 8×8 luminance blocks and four 4×8 chrominance blocks. Alternatively, the encoder 800 and decoder 900 are object-based, use a different macroblock or block format, or perform operations on sets of pixels of different size or configuration.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 8 is a block diagram of a general video encoder system 800. The encoder system 800 receives a sequence of video frames including a current frame 805, and produces compressed video information 895 as output. Particular embodiments of video encoders typically use a variation or supplemented version of the generalized encoder 800.

The encoder system 800 compresses predicted frames and key frames. For the sake of presentation, FIG. 8 shows a path for key frames through the encoder system 800 and a path for predicted frames. Many of the components of the encoder system 800 are used for compressing both key frames and predicted frames. The exact operations performed by those components can vary depending on the type of information being compressed.

A predicted frame (also called P-frame, B-frame, or inter-coded frame) is represented in terms of prediction (or difference) from one or more reference (or anchor) frames. A prediction residual is the difference between what was predicted and the original frame. In contrast, a key frame (also called I-frame, intra-coded frame) is compressed without reference to other frames.

If the current frame 805 is a forward-predicted frame, a motion estimator 810 estimates motion of macroblocks or other sets of pixels of the current frame 805 with respect to a reference frame, which is the reconstructed previous frame 825 buffered in a frame store (e.g., frame store 820). If the current frame 805 is a bi-directionally-predicted frame (a B-frame), a motion estimator 810 estimates motion in the current frame 805 with respect to two reconstructed reference frames. Typically, a motion estimator estimates motion in a B-frame with respect to a temporally previous reference frame and a temporally future reference frame. Accordingly, the encoder system 800 can comprise separate stores 820 and 822 for backward and forward reference frames. For more information on bi-directionally predicted frames, see U.S. patent application Ser. No. 10/622,378, entitled, "Advanced Bi-Directional Predictive Coding of Video Frames," filed Jul. 18, 2003.

The motion estimator 810 can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator 810 outputs as side information motion information 815 such as motion vectors. A motion compensator 830 applies the motion information 815 to the reconstructed frame(s) 825 to form a motion-compensated current frame 835. The prediction is rarely perfect, however, and the difference between the motion-compensated current frame 835 and the original current frame 805 is the prediction residual 845. Alternatively, a motion estimator and motion compensator apply another type of motion estimation/compensation.

A frequency transformer 860 converts the spatial domain video information into frequency domain (i.e., spectral) data. For block-based video frames, the frequency transformer 860 applies a discrete cosine transform ["DCT"] or variant of DCT to blocks of the pixel data or prediction residual data, producing blocks of DCT coefficients. Alternatively, the frequency transformer 860 applies another conventional frequency transform such as a Fourier transform or uses wavelet or subband analysis. If the encoder uses spatial extrapolation (not shown in FIG. 8) to encode blocks of key frames, the frequency transformer 860 can apply a re-oriented frequency transform such as a skewed DCT to blocks of prediction residuals for the key frame. In some embodiments, the frequency transformer 860 applies an 8×8, 8×4, 4×8, or other size frequency transforms (e.g., DCT) to prediction residuals for predicted frames.

A quantizer 870 then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 800 can use frame dropping, adaptive filtering, or other techniques for rate control.

If a given macroblock in a predicted frame has no information of certain types (e.g., no motion information for the macroblock and/or no residual information), the encoder 800 may encode the macroblock as a skipped macroblock. If so, the encoder signals the skipped macroblock in the output bit stream of compressed video information 895.

When a reconstructed current frame is needed for subsequent motion estimation/compensation, an inverse quantizer 876 performs inverse quantization on the quantized spectral data coefficients. An inverse frequency transformer 866 then performs the inverse of the operations of the frequency transformer 860, producing a reconstructed prediction residual (for a predicted frame) or a reconstructed key frame. If the current frame 805 was a key frame, the reconstructed key frame is taken as the reconstructed current frame (not shown). If the current frame 805 was a predicted frame, the reconstructed prediction residual is added to the motion-compensated current frame 835 to form the reconstructed current frame. A frame store (e.g., frame store 820) buffers the reconstructed current frame for use in predicting another frame. In some embodiments, the encoder applies a deblocking filter to the reconstructed frame to adaptively smooth discontinuities in the blocks of the frame.

The entropy coder 880 compresses the output of the quantizer 870 as well as certain side information (e.g., motion information 815, spatial extrapolation modes, quantization step size). Typical entropy coding techniques include arithmetic coding, differential coding, Huffman coding, run length coding, LZ coding, dictionary coding, and combinations of the above. The entropy coder 880 typically uses different coding techniques for different kinds of information (e.g., DC coefficients, AC coefficients, different kinds of side information), and can choose from among multiple code tables within a particular coding technique.

The entropy coder 880 puts compressed video information 895 in the buffer 890. A buffer level indicator is fed back to bit rate adaptive modules.

The compressed video information 895 is depleted from the buffer 890 at a constant or relatively constant bit rate and stored for subsequent streaming at that bit rate. Therefore, the level of the buffer 890 is primarily a function of the entropy of the filtered, quantized video information, which affects the efficiency of the entropy coding. Alternatively, the encoder system 800 streams compressed video information immediately following compression, and the level of the buffer 890 also depends on the rate at which information is depleted from the buffer 890 for transmission.

Before or after the buffer 890, the compressed video information 895 can be channel coded for transmission over the network. The channel coding can apply error detection and correction data to the compressed video information 895.

B. Video Decoder

FIG. 9 is a block diagram of a general video decoder system 900. The decoder system 900 receives information 995 for a compressed sequence of video frames and produces output including a reconstructed frame 905. Particular embodiments of video decoders typically use a variation or supplemented version of the generalized decoder 900.

The decoder system 900 decompresses predicted frames and key frames. For the sake of presentation, FIG. 9 shows a path for key frames through the decoder system 900 and a path for predicted frames. Many of the components of the decoder system 900 are used for decompressing both key frames and predicted frames. The exact operations performed by those components can vary depending on the type of information being decompressed.

A buffer 990 receives the information 995 for the compressed video sequence and makes the received information available to the entropy decoder 980. The buffer 990 typically receives the information at a rate that is fairly constant over time, and includes a jitter buffer to smooth short-term variations in bandwidth or transmission. The buffer 990 can include a playback buffer and other buffers as well. Alternatively, the buffer 990 receives information at a varying rate. Before or after the buffer 990, the compressed video information can be channel decoded and processed for error detection and correction.

The entropy decoder 980 entropy decodes entropy-coded quantized data as well as entropy-coded side information (e.g., motion information 915, spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 980 frequently uses different decoding techniques for different kinds of information (e.g., DC coefficients, AC coefficients, different kinds of side information), and can choose from among multiple code tables within a particular decoding technique.

A motion compensator 930 applies motion information 915 to one or more reference frames 925 to form a prediction 935 of the frame 905 being reconstructed. For example, the motion compensator 930 uses a macroblock motion vector to find a macroblock in a reference frame 925. A frame buffer (e.g., frame buffer 920) stores previously reconstructed frames for use as reference frames. Typically, B-frames have more than one reference frame (e.g., a temporally previous reference frame and a temporally future reference frame). Accordingly, the decoder system 900 can comprise separate frame buffers 920 and 922 for backward and forward reference frames.

The motion compensator 930 can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder 900 also reconstructs prediction residuals.

When the decoder needs a reconstructed frame for subsequent motion compensation, a frame buffer (e.g., frame buffer 920) buffers the reconstructed frame for use in predicting another frame. In some embodiments, the decoder applies a deblocking filter to the reconstructed frame to adaptively smooth discontinuities in the blocks of the frame.

An inverse quantizer 970 inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer 960 converts the quantized, frequency domain data into spatial domain video information. For block-based video frames, the inverse frequency transformer 960 applies an inverse DCT ["IDCT"] or variant of IDCT to blocks of the DCT coefficients, producing pixel data or prediction residual data for key frames or predicted frames, respectively. Alternatively, the frequency transformer 960 applies another conventional inverse frequency transform such as a Fourier transform or uses wavelet or subband synthesis. If the decoder uses spatial extrapolation (not shown in FIG. 9) to decode blocks of key frames, the inverse frequency transformer 960 can apply a re-oriented inverse frequency transform such as a skewed IDCT to blocks of prediction residuals for the key frame. In some embodiments, the inverse frequency transformer 960 applies an 8×8, 8×4, 4×8, or other size inverse frequency transforms (e.g., IDCT) to prediction residuals for predicted frames.

When a skipped macroblock is signaled in the bit stream of information 995 for a compressed sequence of video frames, the decoder 900 reconstructs the skipped macroblock without using information (e.g., motion information and/or residual information) normally included in the bit stream for non-skipped macroblocks.

III. Overview of Motion Vector Coding

The described techniques and tools improve compression efficiency for predicted images (e.g., frames) in video sequences. Described techniques and tools apply to a one-motion-vector-per-macroblock (1MV) model of motion estimation and compensation for predicted frames (e.g., P-frames). Described techniques and tools also employ specialized mechanisms to encode motion vectors in certain situations (e.g., four-motion-vectors-per-macroblock (4MV) models, mixed 1MV and 4MV models, B-frames, and interlace coding) that give rise to data structures that are not homogeneous with the 1MV model. For more information on interlace video, see U.S. patent application Ser. No. 10/622, 284, entitled, "Intraframe and Interframe Interlace Coding and Decoding," filed Jul. 18, 2003. Described techniques and tools are also extensible to future formats.

With an increased average number of motion vectors per frame (e.g., in 4MV and mixed 1MV and 4MV models), it is desirable to design a more efficient scheme to encode motion vector information. As in earlier standards, described techniques and tools use predictive coding to compress motion vector information. However, there are several key differences. The described techniques and tools, individually or in combination, include the following features:

1. An extended motion vector alphabet:
   a. The I/P switch is jointly coded with the motion vector. In other words, a bit code indicating that a macroblock (or block) is to be coded as an intra macroblock or intra block, respectively, is joint coded with a pseudo motion vector, the joint code indicating it is an intra macroblock/block.
   b. In addition to the I/P switch, a "terminal" symbol is coded jointly with the motion vector. The terminal symbol indicates whether there is any subsequent data pertaining to the object (macroblock, block, etc.) being coded. The joint symbol is referred to as an extended motion vector ("MV*").
2. A sub-frame-level (e.g., macroblock level) syntax using an extended motion vector alphabet to efficiently code, e.g., progressive 1MV macroblocks, 4MV macroblocks and B-frames, and interlace 1MV macroblocks, 2MV macroblocks and B-frames.
3. Generation of motion vector predictors and differential motion vectors.
4. Hybrid motion vector encoding with different criteria for identifying hybrid motion vectors.
5. Efficient signaling of motion vector modes at frame level.
6. Differential coding of motion vector residuals based on rollover arithmetic, (similar to modulo arithmetic) to avoid need for pull-back of predictors.

These features are explained in detail in the following sections.

In some embodiments, an encoder derives motion vectors for chrominance planes from luminance motion vectors. However, the techniques and tools described herein are equally applicable to chrominance motion in other embodiments. For example, a video encoder may choose to explicitly send chrominance motion vectors as part of a bit stream, and can use techniques and tools similar to those described herein to encode/decode the chrominance motion vectors.

IV. Extended Motion Vector Alphabet

In some embodiments, an extended motion vector alphabet includes joint codes for jointly coding motion vector information with other information for a block, macroblock, or other set of pixels.

A. Signaling Intra Macroblocks and Blocks

The signaling of an intra-coded set of pixels (e.g., block, macroblock, etc.) can be achieved by extending the alphabet of motion vectors to allow for a symbol (e.g., an I/P switch) indicating an intra area. Intra macroblocks and blocks do not have a true motion vector associated with them. A motion vector (or in the case of an intra-coded set of pixels, a pseudo motion vector) can be appended to an intra symbol to yield a triple of the form <Intra, MVx, MVy> that indicates whether the set of pixels (e.g., macroblock or block) is coded as intra, and if not, what its motion vector should be. When the intra flag is set, MVx and MVy are "don't care" conditions. When the intra flag is zero, MVx and MVy correspond to computed motion vector components.

Joint coding of an intra symbol with motion vectors allows an elegant yet efficient implementation with the ability to switch blocks to intra when four extended motion vectors are used in a macroblock.

B. Signaling Residual Information

In addition to the intra symbol, some embodiments jointly code the presence or absence of subsequent residual symbols with a motion vector. For example, a "last" (or terminal) symbol indicates whether the joint code containing the motion vector or pseudo motion vector is a terminal symbol of a given macroblock, block or field, or if residual data follows (e.g., when last=1 (i.e. last is true), no subsequent data pertains to the area). This joint code can be referred to as an extended motion vector, and is of the form <intra, MVx, MVy, last>. In the syntax diagrams below, an extended motion vector is represented as MV*.

In some embodiments, the extended motion vector symbol <inter, 0, 0, true> is an invalid symbol. The condition that would ordinarily lead to this symbol a special condition called a "skip" condition. Under the skip condition, the current set of pixels (e.g., macroblock) can be predicted (to within quantization error) from its motion vector. No additional data (e.g., residual data) is necessary to decode this area. For efficiency reasons, the skip condition can signaled at the frame level. Therefore, in some embodiments, this symbol is not present in the bit stream. For example, skipped macroblocks have a motion vector such that the differential motion vector is (0, 0) or have no motion at all. In other words, in skipped macroblocks where some motion is present, the skipped macroblocks use the same motion vector as the predicted motion vector. Skipped macroblocks are also defined for 4MV macroblocks, and other cases. For more information on skipped macroblocks, see U.S. patent application Ser. No. 10/321,415, entitled, "Skip Macroblock Coding," filed Dec. 16, 2002.

The last symbol applies to both intra signals and inter motion vectors. The way this symbol is used in different embodiments depends on many factors, including whether a macroblock is a 1MV or 4MV macroblock, or an interlace macroblock (e.g., a field-coded, 2MV macroblock). Moreover, in some embodiments, the last symbol is interpreted differently for interpolated mode B-frames. These concepts are covered in detail below.

V. Syntax for Coding Motion Vector Information

In some embodiments, a video encoder encodes video images using a sub-frame-level syntax (e.g., a macroblock-level syntax) including extended motion vectors. For example, for macroblocks in a video sequence having progressive and interlace P-frames and B-frames, each macroblock is coded with zero, one, two or four associated extended motion vector symbols. The specific number of motion vectors depends on the specifics of the coding mode—(e.g., whether the frame is a P-frame or B-frame, progressive or interlace, 1MV or 4MV-coded, and/or skip coded). Coding modes also determine the order in which the motion vector information is sent. The following sections and corresponding FIGS. 10-14 cover these possibilities and map out the syntax or format for different situations. Although the figures show elements (e.g., extended motion vectors) in certain arrangements, the elements can be arranged in different ways.

In the following sections and the corresponding figures, the symbol MBH denotes a macroblock header—a placeholder for any macroblock level information other than a motion vector, I/P switch or coded block pattern (CBP)). Examples of elements in MBH are skip bit information, motion vector mode information, coding mode information for B-frames, and frame/field information for interlace frames.

A. 1MV Macroblock Syntax

Figure 10:
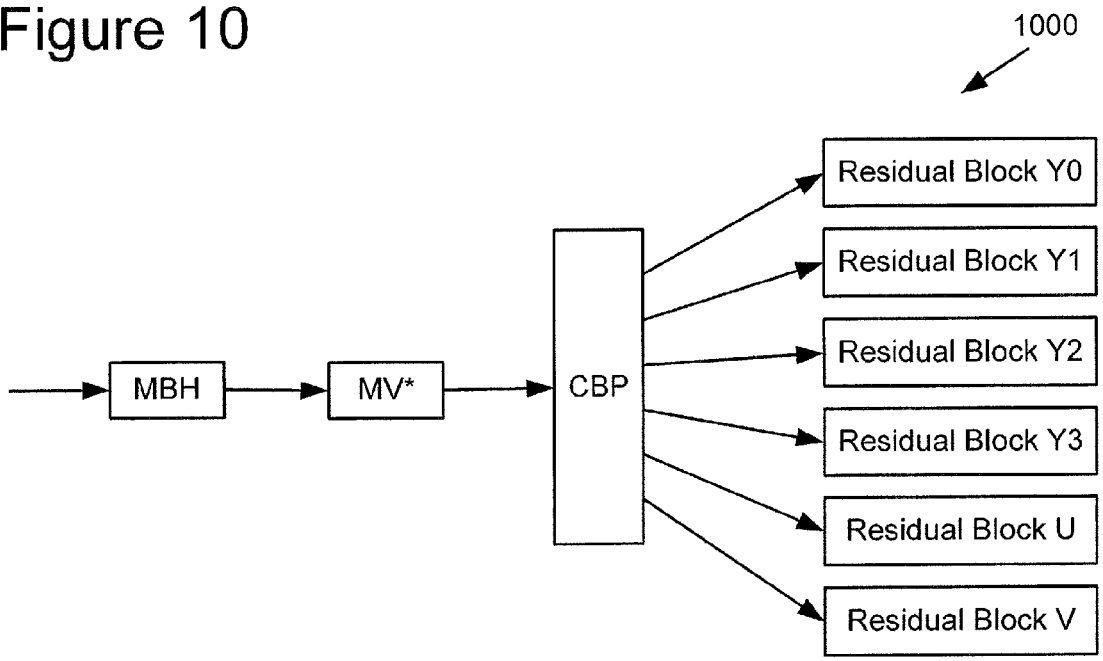
FIG. 10 is a diagram showing a macroblock syntax with an extended motion vector symbol for use in coding progressive 1MV macroblocks in P-frames, forward/backward predicted macroblocks in B-frames, and interlace frame-type macroblocks.

FIG. 10 is a diagram showing an exemplary macroblock syntax 1000 with an extended motion vector symbol for use in coding 1MV macroblocks. Examples of 1MV macroblocks include progressive P-frame macroblocks, interlace frame-coded P-frame macroblocks, progressive forward- or backward-predicted B-frame macroblocks, and interlace frame-coded forward- or backward-predicted B-frame macroblocks. In FIG. 10, MV* is sent after MBH and before CBP.

CBP indicates which of the blocks making up a macroblock have attached residual information. For example, for a 4:2:0 macroblock with four luminance blocks and two chrominance blocks, CBP includes six bits. A corresponding CBP bit indicates whether residual information exists for each block. In MV*, the terminal symbol "last" is set to 1 if CBP is all zero, indicating that there are no residuals for all six blocks in the macroblock. In this case, CBP is not sent. If CBP is not all zero (which under many circumstances is more likely to be the case), the terminal symbol is set to 1, and the CBP is sent, followed by the residual data for blocks that have residuals. For example, in FIG. 10, up to six residual blocks (e.g., luminance residual blocks Y0, Y1, Y2, and Y3, and chrominance residual blocks U and V) can be sent, depending on the value of CBP.

B. 4MV Macroblock Syntax

Figure 11:
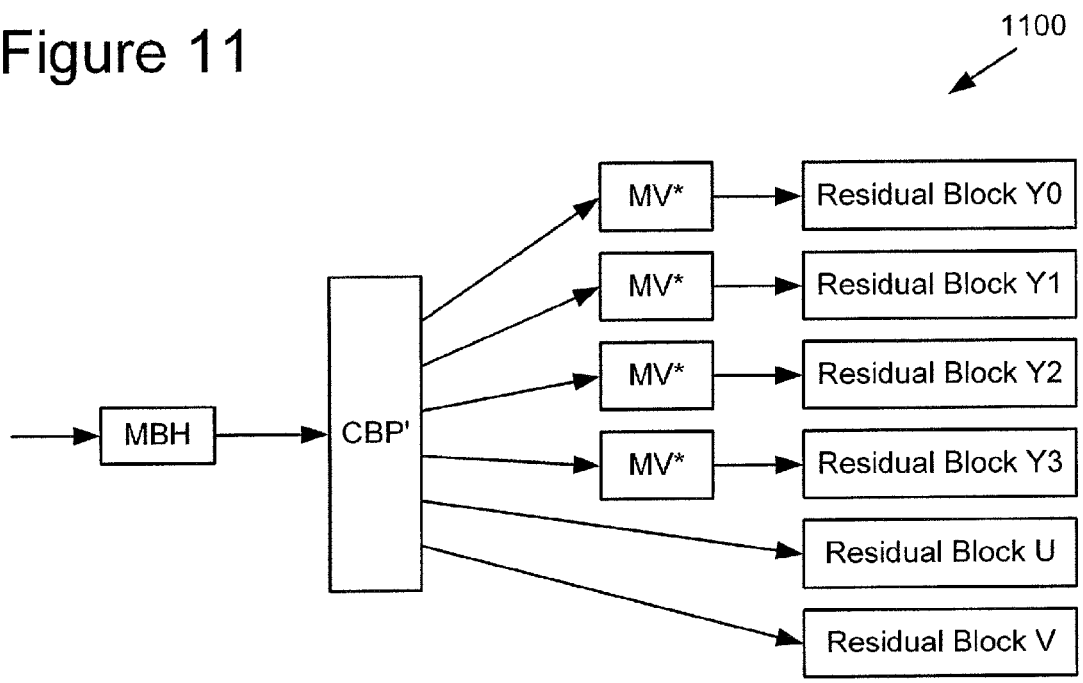
FIG. 11 is a diagram showing a macroblock syntax with an extended motion vector symbol for use in coding progressive 4MV macroblocks in P-frames.

FIG. 11 is a diagram showing an exemplary macroblock syntax 1100 with an extended motion vector symbol for use in coding progressive 4MV macroblocks in P-frames. For the code labeled CBP', when four motion vectors are present in a macroblock, the first four components of the CBP (corresponding to the first four blocks) are reinterpreted to be the union of the events where MV*≠0, and where residuals are present. For example, in FIG. 11, the first four CBP components correspond to the luminance blocks. When a luminance block is intra-coded or inter-coded with a nonzero differential motion vector, or when there are residuals, the block pattern is set to true. There is no change to the chrominance components.

In FIG. 11, the CBP is sent right after MBH. Subsequently, the extended motion vectors for the four luminance blocks are sent only when the corresponding block pattern is nonzero. The terminal symbols of the extended motion vectors are used to send the original CBP information for the luminance blocks, flagging the presence of residuals. As an illustration, if block Y0 has no residuals but does have a nonzero differential motion vector, the first component of CBP would normally be set to true. Therefore, MV* is sent, with its last symbol being set to true. No further information is sent for block Y0.

C. 2MV Macroblock Syntax

Figure 12:
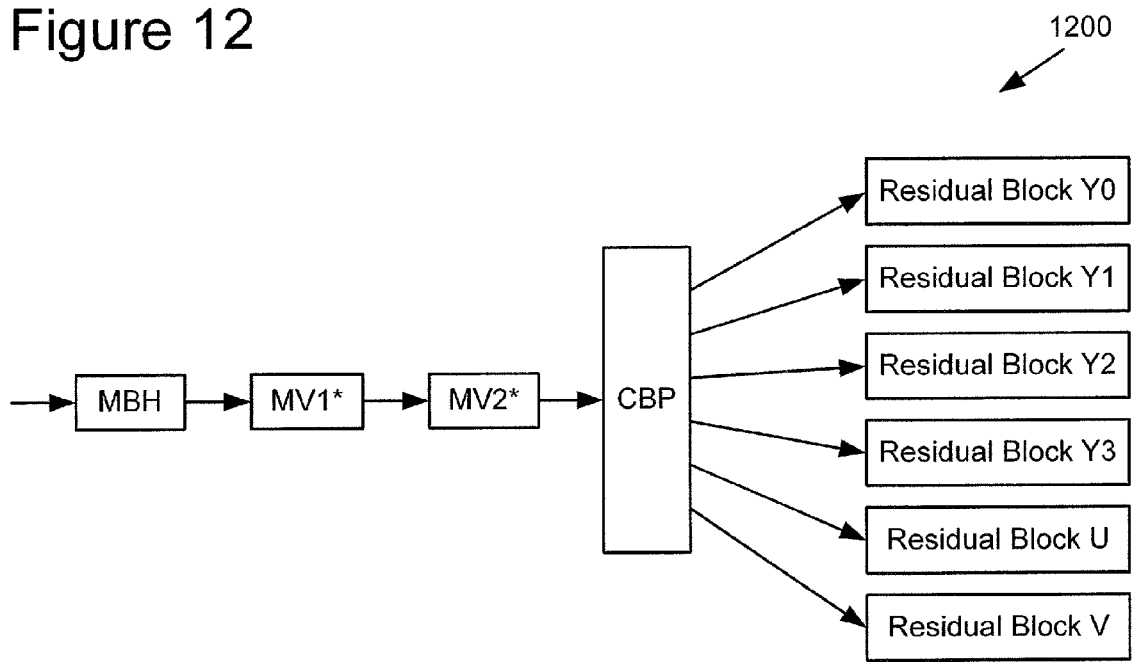
FIG. 12 is a diagram showing a macroblock syntax with extended motion vector symbols for use in coding progressive interpolated macroblocks in B-frames, forward/backward predicted macroblocks in B-frames, and interlace frame-type macroblocks.

FIG. 12 is a diagram showing an exemplary macroblock syntax 1200 with extended motion vector symbols for use in coding 2MV macroblocks (e.g., progressive interpolated macroblocks in B-frames, forward/backward predicted macroblocks in B-frames, and interlace frame-type macroblocks). For example, in progressive sequences and in frame coded interlace sequences, B-frame macroblocks use zero, one or two motion vectors. When there are two motion vectors, the syntax 1200 shown in FIG. 12 is used. This is an extension of the 1MV macroblock syntax 1100 shown in FIG. 11.

In FIG. 12, the two extended motion vectors MV1* and MV2* are sent in a predetermined order. For example, in some embodiments, an encoder sends a backward differential motion vector followed by a forward differential motion vector for a B-frame macroblock, following the macroblock header. In the event that all residuals are zero, the last symbol of the second motion vector is set to true and no further data is sent. In the event that MV2*=0 and CBP=0, the last symbol of MV1* is set to true and the macroblock terminates. When both motion vectors and CBP are zero, the macroblock is skip-coded.

Figure 13:
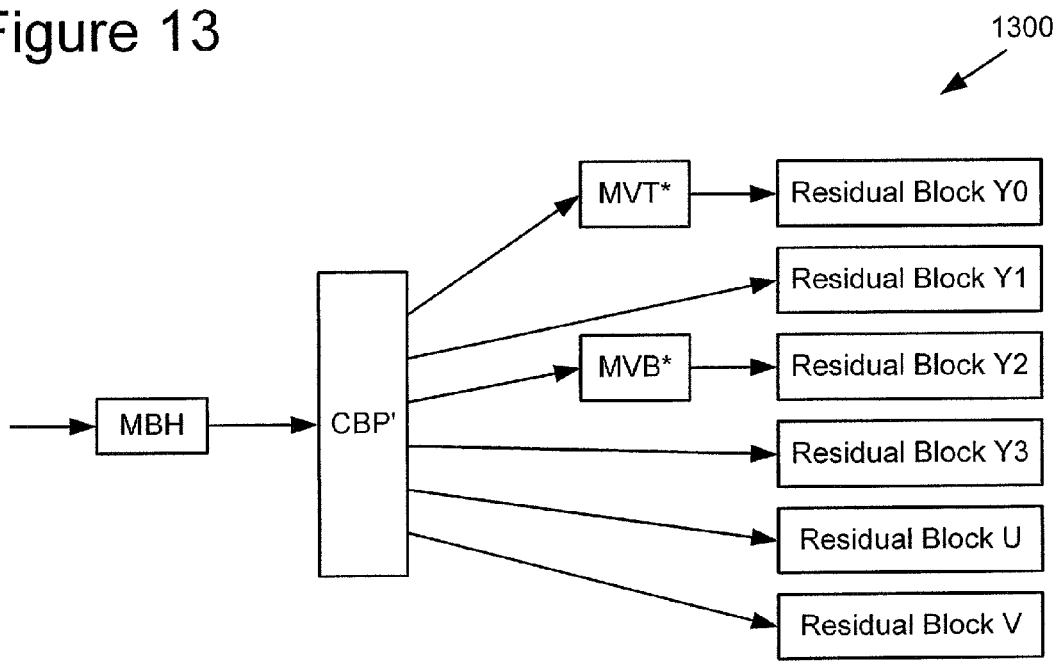
FIG. 13 is a diagram showing a macroblock syntax with extended motion vector symbols for use in coding interlace macroblocks in P-frames and forward/backward predicted field-type macroblocks in B-frames.

D. Macroblock Syntax for Interlace Field-Type Macroblocks in P-Frames and Forward/Backward Predicted Field-Type Macroblocks in B-Frames FIG. 13 is a diagram showing an exemplary macroblock syntax 1300 with extended motion vector symbols for use in coding interlace field-type macroblocks in P-frames and forward/backward predicted field-type macroblocks in B-frames. Such macroblocks have two motion vectors, corresponding to the top and bottom field motion. The extended motion vectors are sent subsequent to a modified CBP (CBP' in FIG. 13). The first and third components of the CBP are reinterpreted to be the union of the corresponding nonzero extended motion vector events and nonzero residual events. The terminal symbols of the top extended motion vector MVT* and the bottom extended motion vector MVB* contain the original block pattern components for the corresponding blocks. Although FIG. 13 shows the extended motion vectors in certain locations, other arrangements are also valid.

Figure 14:
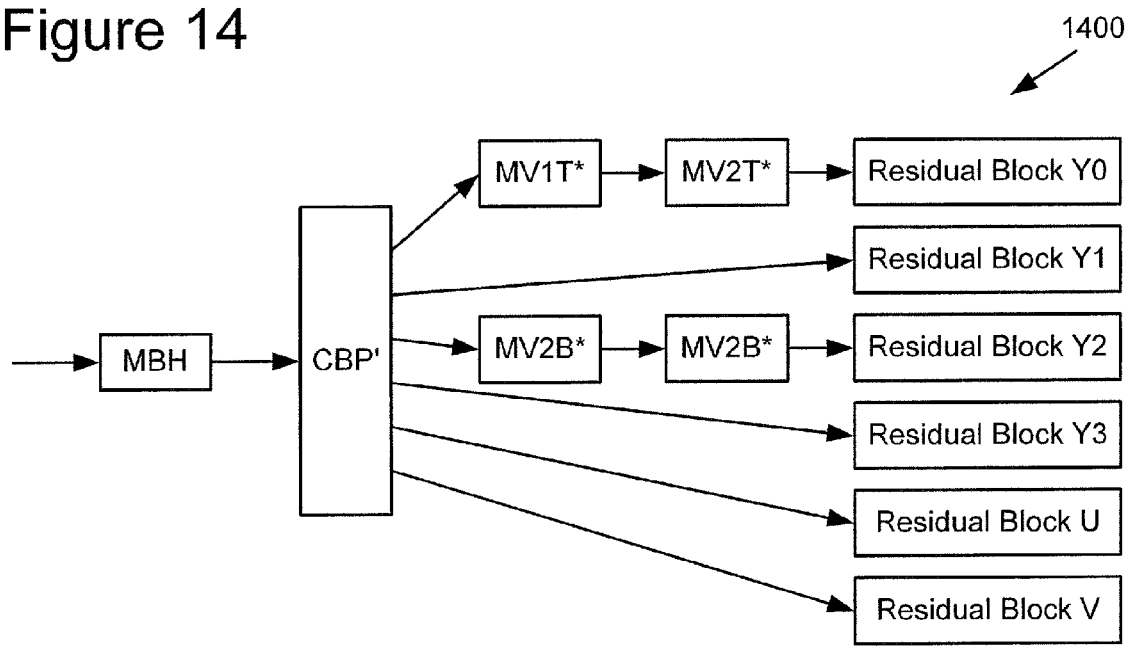
FIG. 14 is a diagram showing a macroblock syntax with extended motion vector symbols for use in coding interlace interpolated field-type macroblocks in B-frames.

E. Macroblock Syntax for Interlace Field-Type Interpolated Macroblocks in B-Frames FIG. 14 is a diagram showing an exemplary macroblock syntax with extended motion vector symbols for use in coding interlace interpolated (bi-directional) field-type macroblocks in B-frames. The technique used to code motion vectors for interlace field-type interpolated B-frame macroblocks combines ideas from interlace field-type P-frame macroblocks and progressive B-frame macroblocks using 2 motion vectors. Again, while FIG. 14 shows an exemplary arrangement having certain overloaded CBP blocks, the four extended motion vectors (e.g., MV1T*, MV2T*, MV1 B* and MV2B*) can be distributed differently across the block data channels.

F. Simplified CBP and MV* Alphabets

In the syntax formats described above, the coded block pattern CBP=0 (i.e., all bits in CBP are equal to zero) does not occur in the bit stream. Accordingly, in some embodiments, for the sake of efficiency, this symbol is not present in the CBP alphabet. For example, for the six blocks in a 4:2:0 macroblock, the coded block pattern alphabet comprises 2^6−1=63 symbols. Moreover, as discussed earlier, the MV* symbol <intra switch, MVx, MVy, last>=<inter, 0, 0, true> is an invalid symbol. Occurrences of this symbol can be coded using skip bits, or in some cases, CBP.

VI. Generation of Motion Vector Predictors and Differential Motion Vectors

Figure 15:
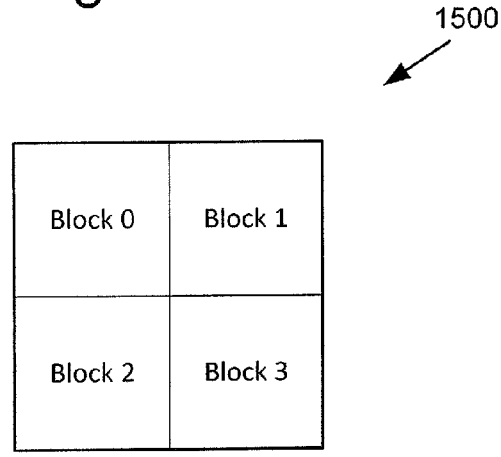
FIG. 15 is a diagram showing a macroblock comprising four blocks.

In some embodiments, to exploit continuity in motion vector information, motion vectors are differentially predicted and encoded from neighboring sets of pixels (e.g., blocks, macroblocks, etc.). For example, a video encoder/decoder uses three motion vectors in the neighborhood of a current block, macroblock or field for computing a prediction. The specific features of a predictor calculation technique depend on factors such as whether the sequence is interlace or progressive, and whether one, two, or four motion vectors are being generated for a given macroblock. For example, in a 1MV macroblock, the macroblock has one corresponding motion vector for the entire macroblock. In a 4MV macroblock, the macroblock has one corresponding motion vector for each block in the macroblock. FIG. 15 is a diagram showing a macroblock 1500 comprising four blocks, the macroblock 1500 has a motion vector corresponding to each block in positions 0-3.

In the following sections, there is only one numerical prediction for a given motion vector, and this is calculated by analyzing candidates (which may also be referred to as predictors) for the motion vector predictor.

A. Motion Vector Candidates in 1MV P-Frames

Figure 16A:
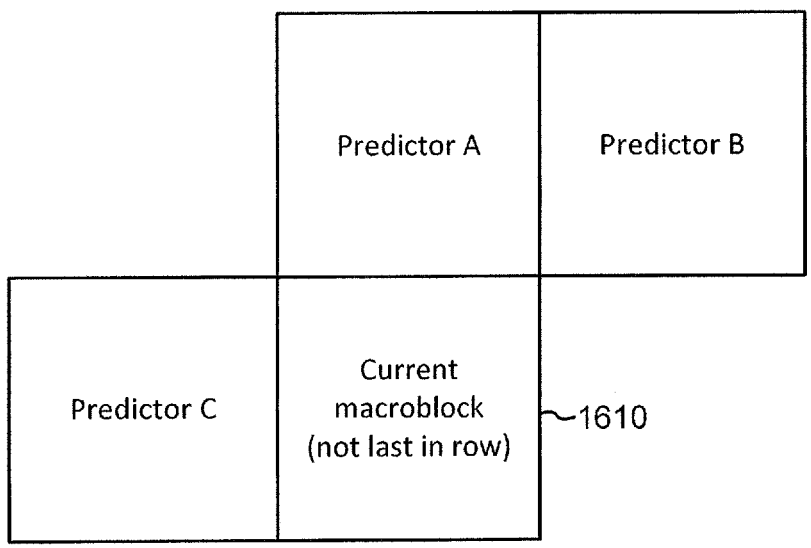
FIGS. 16A and 16B are diagrams showing candidate motion vector predictors for a 1MV macroblock in a P-frames.
Figure 16B:
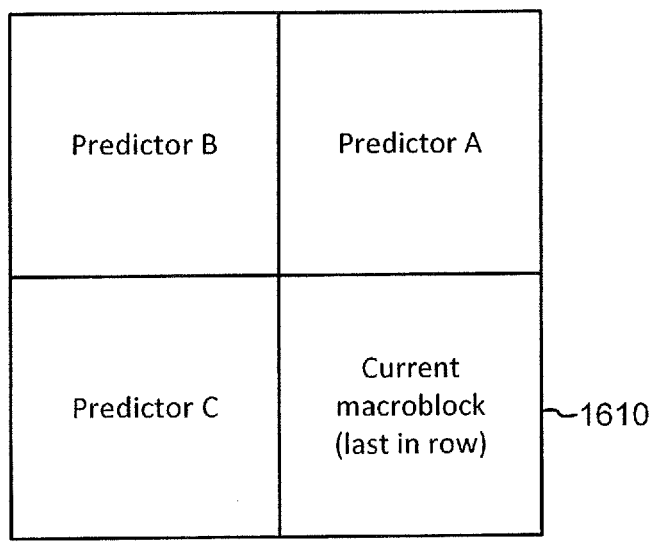

FIGS. 16A and 16B are diagrams showing three candidate motion vector predictors for a current 1MV macroblock 1610 in a P-frame. In FIG. 16A, where the current macroblock 1610 is not the last macroblock in a macroblock row, the candidates are taken from the left (Predictor C), top (Predictor A) and top-right (Predictor B) macroblocks. In FIG. 16B, the macroblock 1610 is the last macroblock in the row. In this case, Predictor B is taken from the top-left macroblock instead of the top-right. In some embodiments, for the special case where the frame is one macroblock wide, the predictor is always Predictor A (the top predictor).

B. Motion Vector Candidates in Mixed-MV P-Frames

FIGS. 17A, 17B, 18A, 18B, 19A, 19B, 20 and 21 show candidate motion vector predictors for 1MV and 4MV macroblocks in mixed-MV P-frames. In these figures, the larger squares are macroblock boundaries and the smaller squares are block boundaries. In some embodiments, for the special case where the frame is one macroblock wide, the predictor is always Predictor A (the top predictor).

Figure 17A:
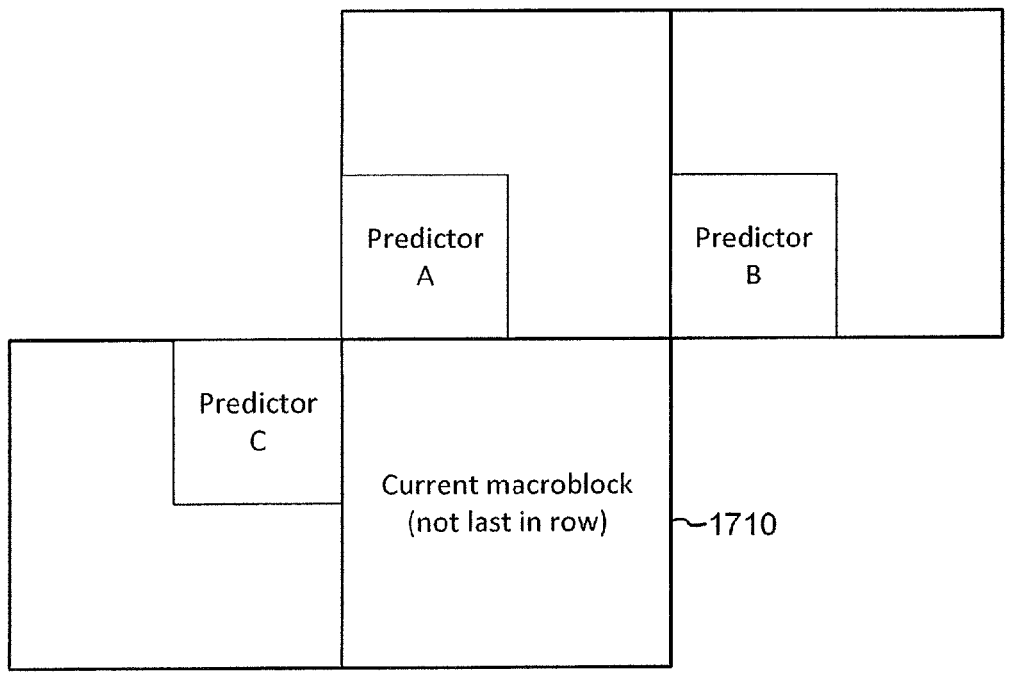
FIGS. 17A and 17B are diagrams showing candidate motion vector predictors for a 1MV macroblock in a mixed 1MV/4MV P-frame.
Figure 17B:
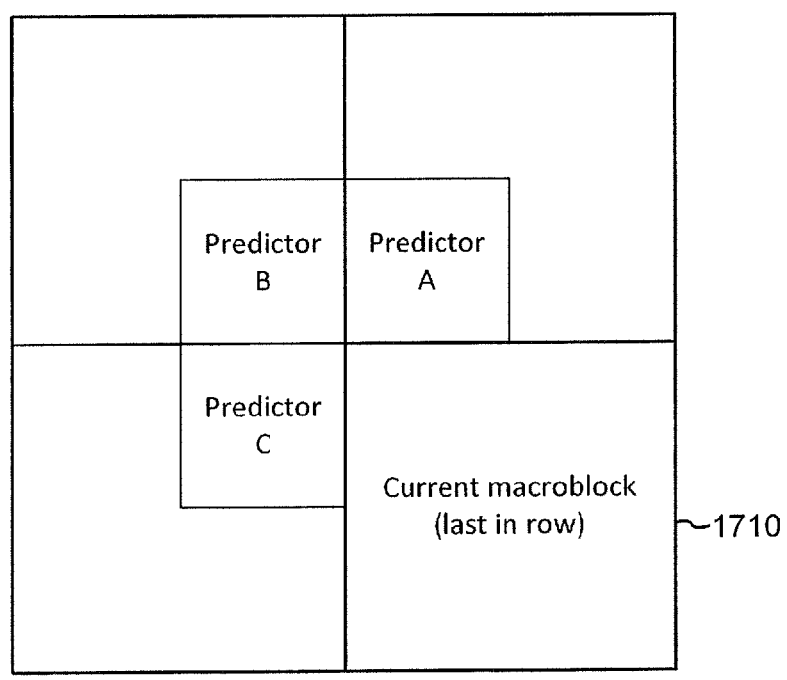

FIGS. 17A and 17B are diagrams showing candidate motion vector predictors for a 1MV macroblock 1710 in a mixed 1MV/4MV P-frame. The neighboring macroblocks may be 1MV or 4MV macroblocks. FIGS. 17A and 17B show the candidate motion vectors under an assumption that the neighbors are 4MV macroblocks. For example, Predictor A is the motion vector for block 2 in the macroblock above the current macroblock 1710 and Predictor C is the motion vector for block 1 in the macroblock immediately to the left of the current macroblock 1710. If any of the neighbors are 1MV macroblocks, the motion vector predictors shown in FIGS. 17A and 17B are taken to be the motion vectors for the entire neighboring macroblock. As FIG. 17B shows, if the macroblock 1710 is the last macroblock in the row, then Predictor B is from block 3 of the top-left macroblock instead of from block 2 in the top-right macroblock (as in FIG. 17A).

In embodiments such as those shown in FIGS. 17A and 17B, Predictor B is taken from the adjacent macroblock column instead of the block immediately to the right of Predictor A because, in the case where the top macroblock (in which Predictor A lies) is 1MV-coded, the block adjacent to Predictor A will have the same motion vector as A. This can essentially force the predictor to predict from the top, which is not always desirable.

Figure 18A:
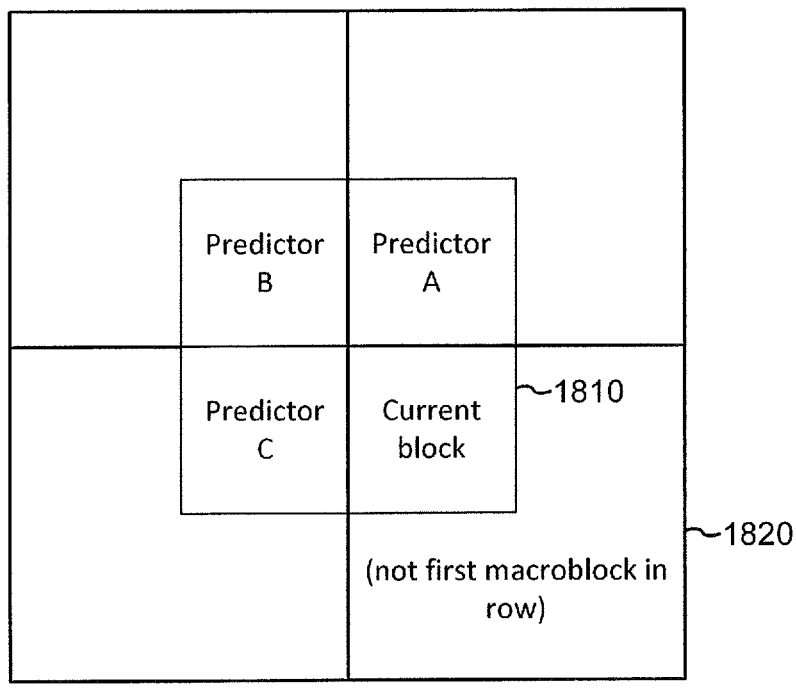
FIGS. 18A and 18B are diagrams showing candidate motion vector predictors for a block at position 0 in a 4MV macroblock in a mixed 1MV/4MV P-frame.
Figure 18B:
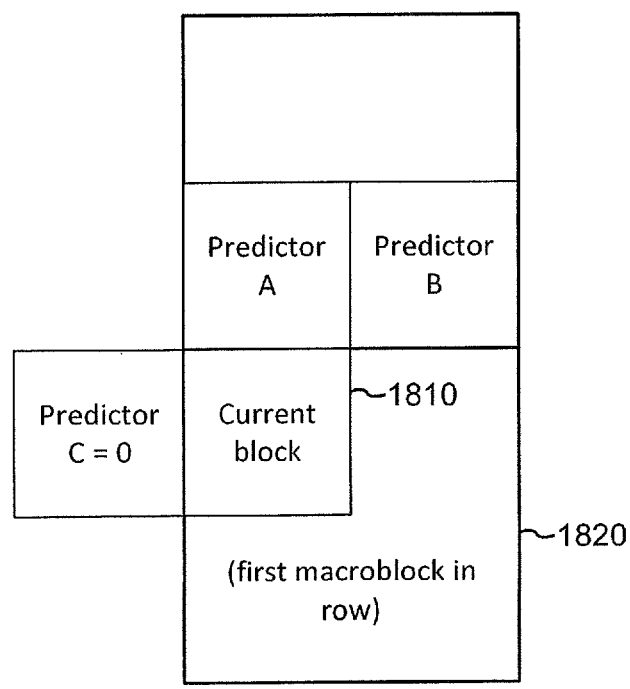

FIGS. 18A, 18B, 19A, 19B, 20 and 21 show predictors for each of the 4 luminance blocks in a 4MV macroblock. For example, FIGS. 18A and 18B are diagrams showing candidate motion vector predictors for a block 1810 at position 0 in a 4MV macroblock 1820 in a mixed 1MV/4MV P-frame. In some embodiments, for the case where the macroblock 1820 is the first macroblock in the row, Predictor B for block 1810 is handled differently than the remaining blocks in the row. In FIG. 18B, Predictor B is taken from the block at position 3 in the macroblock immediately above the current macroblock 1820 instead of from the block at position 3 in the macroblock above and to the left of current macroblock 1820, as is the case in FIG. 18A. Again, in some embodiments, Predictor B is to the left of Predictor A in the more frequently occurring case shown in FIG. 18A because the block to the immediate right of Predictor A will have the same motion vector as Predictor A when the top macroblock is 1MV-coded. In FIG. 18B, Predictor C is equal to zero because it lies outside the picture boundary.

Figure 19A:
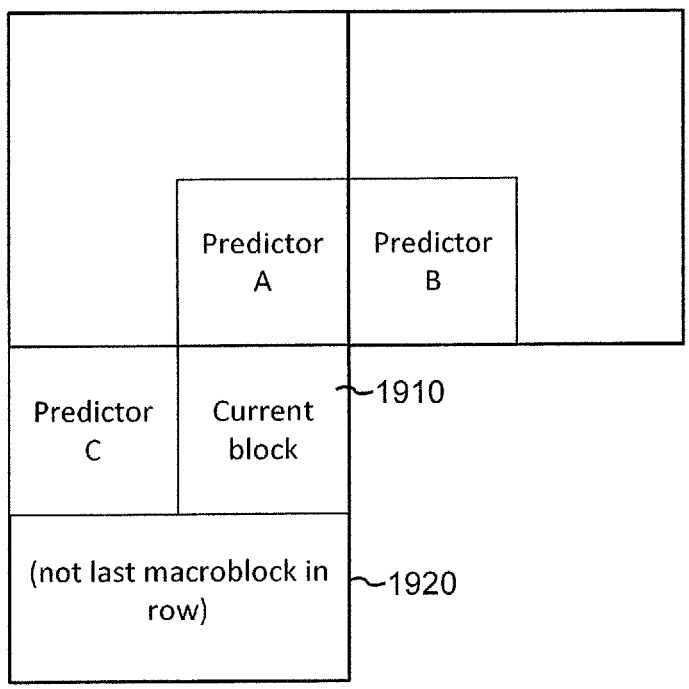
FIGS. 19A and 19B are diagrams showing candidate motion vector predictors for a block at position 1 in a 4MV macroblock in a mixed 1MV/4MV P-frame.
Figure 19B:
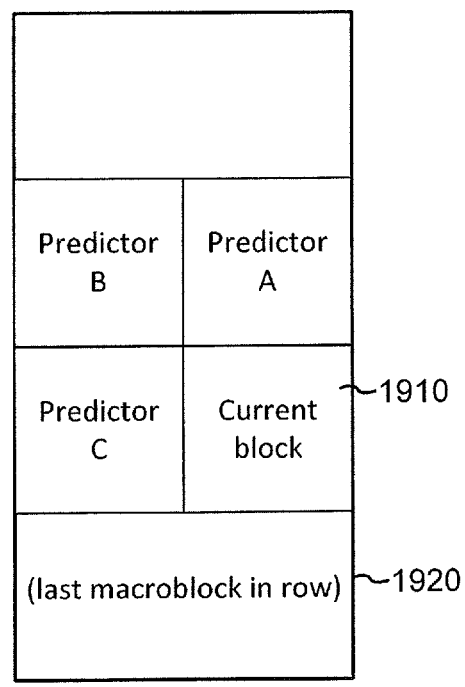

FIGS. 19A and 19B are diagrams showing candidate motion vector predictors for a block 1910 at position 1 in a 4MV macroblock 1920 in a mixed 1MV/4MV P-frame. In FIG. 19B, for the case where the macroblock 1920 is the last macroblock in the row, Predictor B for the current block 1910 is handled differently than for the case shown in FIG. 19A. In FIG. 19B, Predictor B is taken from the block at position 2 in the macroblock immediately above the current macroblock 1920 instead of from the block at position 2 in the macroblock above and to the left of the current macroblock 1920, as is the case in FIG. 19A.

Figure 20:
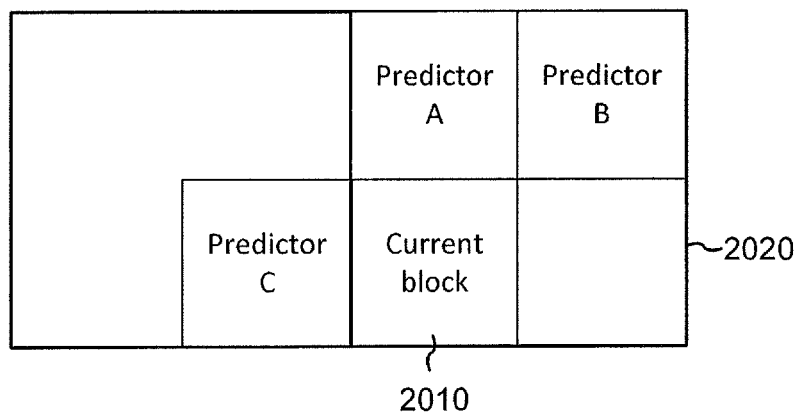
FIG. 20 is a diagram showing candidate motion vector predictors for a block at position 2 in a 4MV macroblock in a mixed 1MV/4MV P-frame.

FIG. 20 is a diagram showing candidate motion vector predictors for a block 2010 at position 2 in a 4MV macroblock 2020 in a mixed 1MV/4MV P-frame. In FIG. 20, if the macroblock 2020 is in the first macroblock column (in other words, if the macroblock 2020 is the first macroblock in a macroblock row) then Predictor C for the blocks 2010 is equal to zero.

Figure 21:
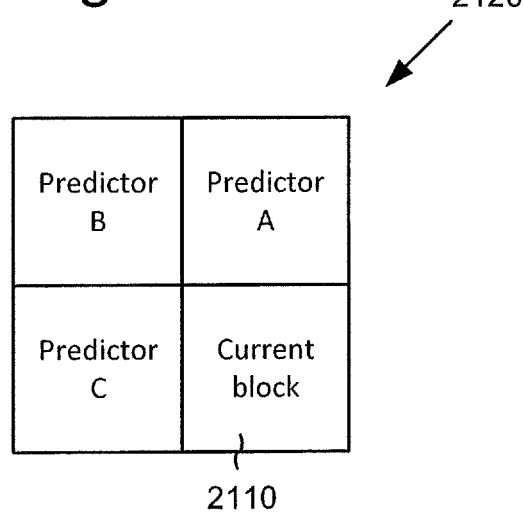
FIG. 21 is a diagram showing candidate motion vector predictors for a block at position 3 in a 4MV macroblock in a mixed 1MV/4MV P-frame.

FIG. 21 is a diagram showing candidate motion vector predictors for a block 2110 at position 3 in a 4MV macroblock 2120 in a mixed 1MV/4MV P-frame. The predictors for block 2110 are the three other blocks within the macroblock 2120. The choice for Predictor B to be taken from the block to the left of Predictor A (e.g., instead of the block to the right of Predictor A) is for causality. In situations such as the example shown in FIG. 21, the block 2110 can be decoded without referencing motion vector information from a subsequent macroblock.

C. Motion Vector Candidates in Interlace P-Frames

FIGS. 22A and 22B are diagrams showing candidate motion vector predictors for a frame-type macroblock 2210 in an interlace P-frame. In FIG. 22A, where the current macroblock 2210 is not the last macroblock in a macroblock row, the candidates are taken from the left (Predictor C), top (Predictor A) and top-right (Predictor B) macroblocks. In FIG. 22B, the macroblock 2210 is the last macroblock in the row. In this case, Predictor B is taken from the top-left macroblock instead of the top-right. In some embodiments, for the special case where the frame is one macroblock wide, the predictor is always Predictor A (the top predictor). When a neighboring macroblock is field-coded, having two motion vectors (one for the top field and the other for the bottom field), the two motion vectors are averaged to generate the prediction candidate. The figure below shows how the motion vector predictor is derived from the neighboring macroblocks for a frame coded macroblock in Interlace P pictures.

In some embodiments, for field-coded macroblocks, the motion vectors of corresponding fields of the neighboring macroblocks are used as candidates for predicting a motion vector for a top or bottom field. For example, FIGS. 23A and 23B are diagrams showing candidate motion vector predictors for a field-type macroblock 2310 in an interlace P-frame. In FIG. 23A, where the current macroblock 2310 is not the last macroblock in a macroblock row, the candidates are taken from fields in the left (Predictor C), top (Predictor A) and top-right (Predictor B) macroblocks. In FIG. 23B, the macroblock 2310 is the last macroblock in the row. In this case, Predictor B is taken from the top-left macroblock instead of the top-right. When a neighboring macroblock is frame coded, the motion vectors corresponding to its fields are deemed to be equal to the motion vector for the entire macroblock. In other words, the top and bottom motion vectors are set to V, where V is the motion vector of the entire macroblock.

D. Calculating a Predictor from Candidates

Given three motion vector predictor candidates, the following pseudocode illustrates the process for calculating the motion vector predictor.

```
if (predictorA is not out of bound) {
    if (predictorC is out of bound && predictorB is out of bound) {
        // picture consists of one MB
        predictor = predictorA;
    } else {
        if (predictorC is out of bound) {
            predictorC = 0;
        }
        numIntra = 0;
        if (predictorA is intra) {
            predictorA = 0;
            numIntra = numIntra + 1;
        }
        if (predictorB is intra) {
            predictorB = 0;
            numIntra = numIntra + 1;
        }
        if (predictorC is intra) {
            predictorC = 0;
            numIntra = numIntra + 1;
        }
        // calculate predictor from A, B and C predictor candidates
        predictor = cmedian3(predictorA, predictorB, predictorC);
    }
} else if (predictorC is not out of bound) {
    predictor = predictorC;
} else {
    predictor = 0;
}
```

The function cmedian3 is the component-wise median of three two dimensional vectors.

E. Pullback of Predictor

Figure 24:
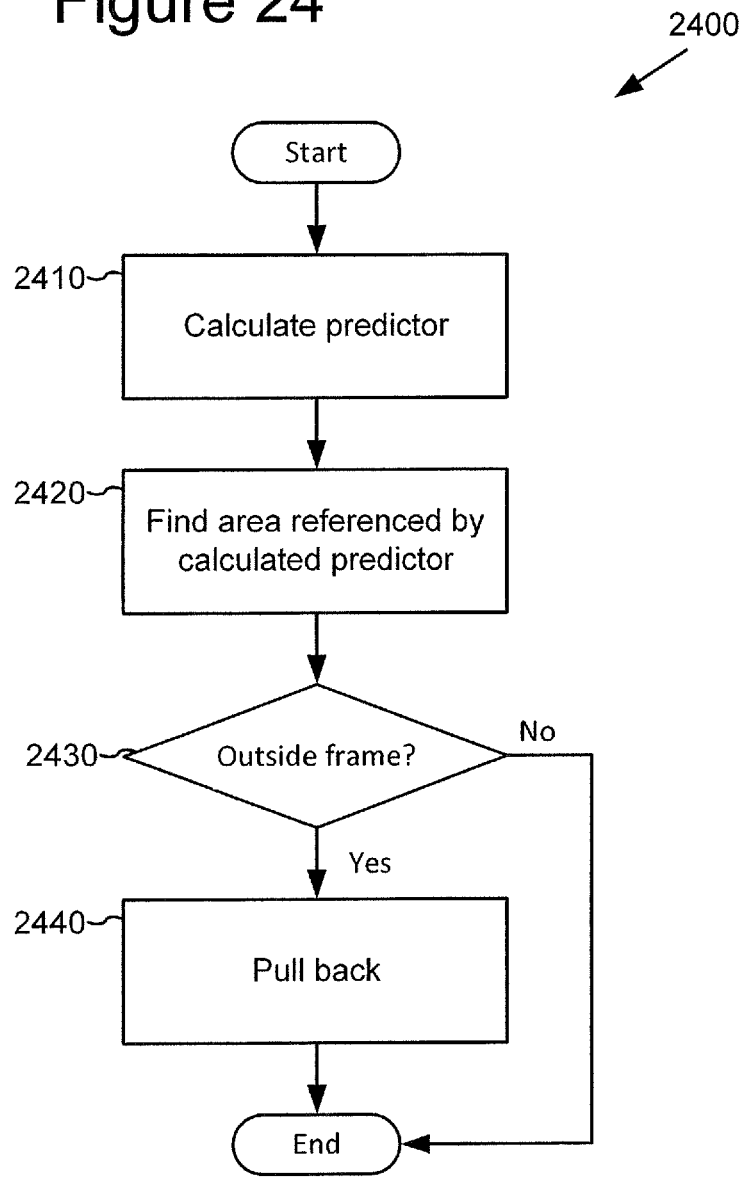
FIG. 24 is a flow chart showing a technique for performing a pull back for a motion vector predictor.

In some embodiments, after the predictor is computed, an encoder/decoder verifies whether the area of the image referenced by the predictor is within the frame. If the area is entirely outside the frame, it is pulled back to an area that overlaps the frame by one pixel width, overlapping the frame at the area closest to the original area. For example, FIG. 24 shows a technique 24 for performing a pull back for a motion vector predictor. At 2410, an encoder/decoder calculates a predictor. At 2420, the encoder/decoder then finds the area referenced by the calculated predictor. At 2430, the encoder/decoder determines whether the referenced area is completely outside the frame. If not, the process ends. If so, the encoder/decoder at 2440 pulls back the predictor.

In some embodiments, an encoder/decoder uses the following rules for performing predictor pull backs:
1. For a macroblock motion vector: The top-left point of a 16×16 area pointed to by the predictor is restricted to be from −15 to (picture width−1) in the vertical and horizontal dimensions.
2. For a block motion vector: The top-left point of a 8×8 area pointed to by the predictor is restricted to be from −7 to (picture width−1) in the vertical and horizontal dimensions.
3. For a field motion vector: In the horizontal dimension, the top-left point of a 8×16 area pointed to by the predictor is restricted to be from −15 to (picture width−1). In the vertical dimension, the top-left point of this area is restricted to be from −7 to (picture height−1).

Although the predicted motion vector prior to pullback is valid, pullback assures that more diversity is available in the local area around the predictor. This allows for better predictions by lowering the cost of useful motion vectors.

F. Hybrid Motion Vectors

In some embodiments, if a P-frame is 1MV or mixed-MV, a calculated predictor is tested relative to the A and C predictors, such as those described above. This test determines whether the motion vector must be hybrid coded.

Figure 25:
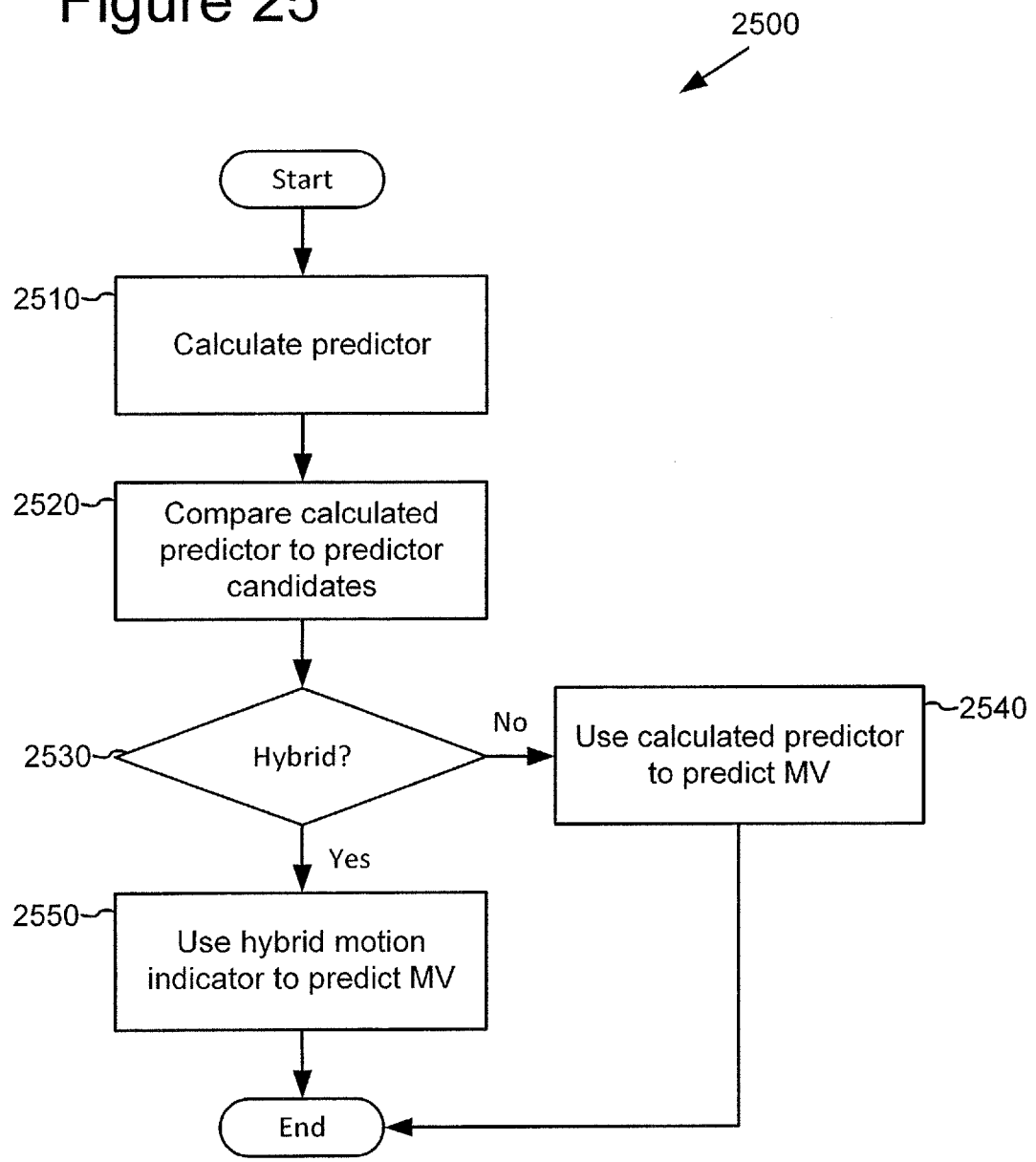
FIG. 25 is a flow chart showing a technique for determining whether to use a hybrid motion vector for a set of pixels.

For example, FIG. 25 is a flow chart showing a technique 2500 for determining whether to use a hybrid motion vector for a set of pixels (e.g., a macroblock, block, etc.). At 2510, a video encoder/decoder calculates a predictor for a set of pixels. At 2520, the encoder/decoder compares the calculated predictor to one or more predictor candidates. At 2530, the encoder/decoder determines whether a hybrid motion vector should be used. If not, the encoder/decoder at 2540 uses the previously calculated predictor to predict the motion vector for the set of pixels. If so, the encoder/decoder at 2550 uses a hybrid motion indicator to determine or signal which candidate predictor to use as the predictor for the set of pixels.

When the variance among the three motion vector candidates used in a prediction is high, the true motion vector is likely to be close to one of the candidate vectors, especially the vectors to the left and the top of the current macroblock or block (Predictors A and C, respectively). When the candidates are far apart, their component-wise median is often not an accurate predictor of motion in a current macroblock. Hence, in some embodiments, an encoder sends an additional bit indicating which candidate the true motion vector is closer to. For example, when the indicator bit indicates that the motion vector for Predictor A or C is the closer one, a decoder uses it as the predictor. The decoder must determine for each motion vector whether to expect a hybrid motion indicator bit, and this determination can be made from causal motion vector information.

The following pseudo-code illustrates this determination. In this example, when either Predictor A or Predictor C is intra-coded, the corresponding motion is deemed to be zero.
  predictor: The calculated motion vector prediction, possibly reset below
  sabs( ): Sum of absolute values of components

```
if ((predictorA is out of bounds) || (predictorC is out of bounds))
{
    return 0 //not a hybrid motion vector
}
else
{
    if (predictorA is intra)
        sum = sabs(predictor)
```

-continued

```
    else
        sum = abs(predictor − predictorA)
    if (sum > 32)
        return 1 // hybrid motion vector
    else
    {
        if (predictorC is intra)
            sum = sabs(predictor)
        else
            sum = abs(predictor − predictorC)
        if (sum > 32)
            return 1 // hybrid motion vector
    }
    return 0 // not a hybrid motion vector
}
```

An advantage of the above approach is that it uses the computed predictor—and in the typical case when there is no hybrid motion, the additional computations are not expensive.

In some embodiments, in a bit stream syntax, the hybrid motion vector indicator bit is sent together with the motion vector itself. Hybrid motion vectors may occur even when a set of pixels (e.g., block, macroblock, etc.) is skipped, in which case the one bit indicates whether to use A or C as the true motion for the set of pixels. In such cases, in the bit stream syntax, the hybrid bit is sent where the motion vector would have been had it not been skipped.

Hybrid motion vector prediction can be enabled or disabled in different situations. For example, in some embodiments, hybrid motion vector prediction is not used for interlace pictures (e.g., field-coded P pictures). A decision to use hybrid motion vector prediction can be made at frame level, sequence level, or some other level.

VII. Motion Vector Modes

In some embodiments, motion vectors are specified to half-pixel or quarter-pixel accuracy. Frames can also be 1MV frames, or mixed 1MV/4MV frames, and can use bicubic or bilinear interpolation. These choices make up the motion vector mode. In some embodiments, the motion vector mode is sent at the frame level. Alternatively, an encoder chooses motion vector modes on some other basis, and/or sends motion vector mode information at some other level.

In some embodiments, an encoder uses one of four motion compensation modes. The frame-level mode indicates (a) possible number of motion vectors per macroblock, (b) motion vector sampling accuracy, and (c) interpolation filter. The four modes (ranked in order of complexity/overhead cost) are:
1. Mixed 1MV/4MV per macroblock, quarter pixel, bicubic interpolation
2. 1MV per macroblock, quarter pixel, bicubic interpolation
3. 1MV per macroblock, half pixel, bicubic interpolation
4. 1MV per macroblock, half pixel, bilinear interpolation VIII. Motion Vector Range and Rollover Arithmetic Some embodiments use motion vectors that are specified in dyadic (power of two) ranges, with the range of permissible motion vectors in the x-component being larger than the range in the y-component. The range in the x-component is generally larger because (a) high motion typically occurs in the horizontal direction and (b) the cost of motion compensation with a large displacement is typically much higher in the vertical direction.

Some embodiments specify a baseline motion vector range of −64 to 63.x pixels for the x-component, and −32 to 31.x pixels for the y-component. The ".x" fraction is dependent on motion vector resolution. For example, for half-pixel sampling, .x is 0.5 and for quarter-pixel accuracy .x is 0.75. The total number of discrete motion vector components in the x and y directions are therefore 512 and 256, respectively, for bicubic filters (for bilinear filters, these numbers are 256 and 128). In other embodiments, the range is expanded to allow longer motion vectors in "broadcast modes."

Table 1 shows different ranges for motion vectors (in addition to the baseline), signaled by the variable-length codeword MVRANGE.

TABLE 1

Extended motion vector range

| MVRANGE | Range in X | Range in Y |
|---|---|---|
| 0 (baseline) | (−64, 63.x) | (−32, 31.x) |
| 10 | (−128, 127.x) | (−64, 63.x) |
| 110 | (−512, 511.x) | (−128, 127.x) |
| 111 | (−1024, 1023.x) | (−256, 255.x) |

Motion vectors are transmitted in the bit stream by encoding their differences from causal predictors. Since the ranges of both motion vectors and predictors are bounded (e.g., by one of the ranges described above), the range of the differences is also bounded. In order to maximize encoding efficiency, rollover arithmetic is used to encode the motion vector difference.

Figure 26:
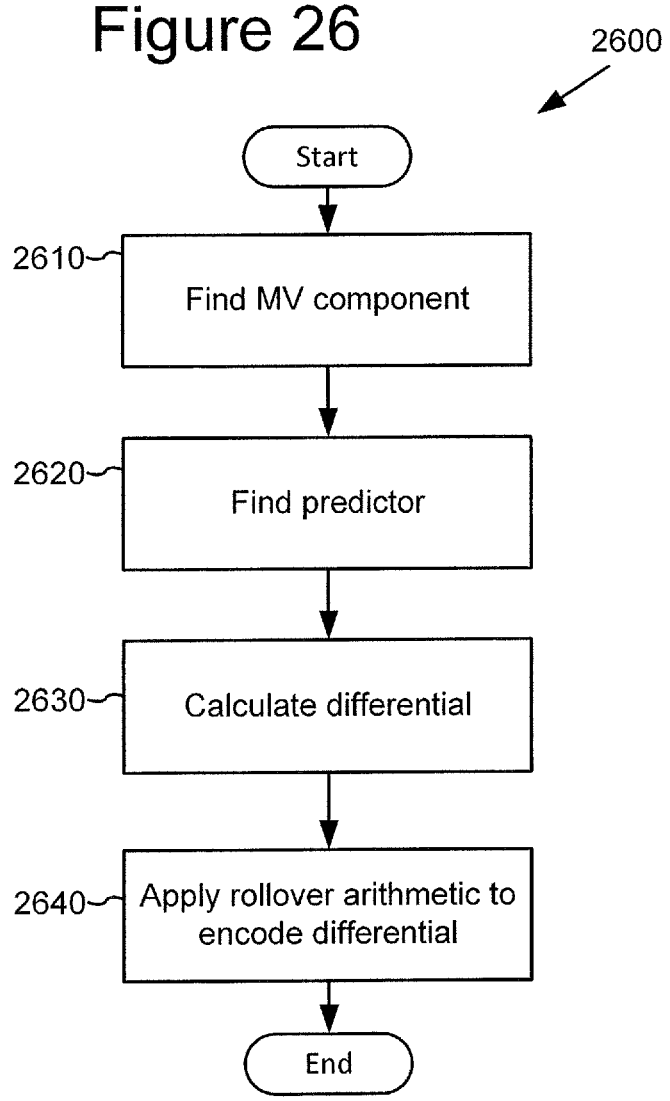
FIG. 26 is a flow chart showing a technique for applying rollover arithmetic to a differential motion vector.

FIG. 26 shows a technique 2600 for applying rollover arithmetic to a differential motion vector. For example, at 2610, an encoder finds a motion vector component for a macroblock. The encoder then finds a predictor for that motion vector component at 2620. At 2630, the encoder calculates a differential for the motion vector component, based on the predictor. At 2640, the encoder then applies rollover arithmetic to encode the differential. Motion vector encoding using rollover arithmetic on the differential motion vector is a computationally simple yet efficient solution.

Let the operation Rollover(I, K) convert I into a signed K bit representation such that the lower K bits of I match those of Rollover(I, K). We know the following: If A and B are integers, or fixed point numbers, such that Rollover(A, K)=A and Rollover(B, K)=B, then:

$$B=\text{Rollover}(A+\text{Rollover}(B-A,K),K).$$

Replacing A with MVPx and B with MVx, the following relationship holds:

$$MVx=\text{Rollover}(MVPx+\text{Rollover}(MVx-MVPx),K)$$

where K is chosen as the logarithm to base 2 of the motion vector alphabet size, assuming the size is a power of 2. The differential motion vector $\Delta MVx$ is set to Rollover(MVx−MVPx), which is represented in K bits.

In some embodiments, rollover arithmetic is applied according to the following example.

Assume that the current frame is encoded using the baseline motion vector range, with quarter pixel accuracy motion vectors. The range of both the x-component of a motion vector of a macroblock (MVx) and the x-component of its predicted motion (MVPx) is (−64, 63.75). The alphabet size for each is $2^9=512$. In other words, there are 512 distinct values each for MVx and MVPx.

The difference $\Delta MVx$ (MVx−MVPx) can be in the range (−128, 127.5). Therefore, the alphabet size for MVx is $2^{10}−1=1023$. However, using rollover arithmetic, 9 bits of precision is sufficient to transmit the difference signal, in order to uniquely recover MVx from MVPx.

Let MVx=−63 and MVPx=63 with K=log 2(512)=9. At quarter-pixel motion resolution, with an alphabet size of 512, the fixed point hexadecimal representations of MVx and MVPx are respectively 0xFFFFFF04 and 0x0FC, of which only the last 9 bits are unique. MVx−MVPx=0xFFFFFE08. The differential motion vector value is:

$$\Delta MVx=\text{Rollover}(0xFFFFFE08,9)=0x008$$

which is a positive quantity, although the raw difference is negative. On the decoder side, MVx is recovered from MVPx:

$$MVx=\text{Rollover}(0x0FC+0x008,9)=\text{Rollover}(0x104)$$
$$=0xF\ldots F04$$

which is the fixed point hexadecimal representation of −63.

The same technique is used for coding the Y component. For example, K is set to 8 for the baseline MV range, at quarter-pixel resolution. In general, the value of K changes between x- and y-components, between motion vector resolutions, and between motion vector ranges.

IX. Extensions

In addition to the embodiments described above, and the previously described variations of those embodiments, the following is a list of possible extensions of some of the described techniques and tools. It is by no means exhaustive.

1. Motion vector ranges can be any integer or fixed point number, with rollover arithmetic carried out appropriately.
2. Additional motion vector modes can be used. For example, a 4MV, ⅛-pixel resolution, six-tap interpolation filter mode, can be added to the present four modes. Other modes, including different combinations of motion vector resolutions, filters, and number of motion vectors, can also be used. The mode may be signaled per slice, group of pictures (GOP), or other level of data object.
3. For interlace field-coded motion compensation, or for encoders/decoders using multiple reference frames, the index of the field or frame referenced by the motion compensator may be joint coded with extended motion vector information.
4. Other descriptors such as an entropy code table index, fading parameters, etc. may also be joint coded with extended motion vector information.
5. Some of the above descriptions assume a 4:2:0 or 4:1:1 video source. With other color configurations (such as 4:2:2), the number of blocks within a macroblock might change, yet the described techniques and tools can also be applied to the other color configurations.
6. Syntax using the extended motion vector can be extended to more complicated cases, such as 16 motion vectors per macroblock, and other cases.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of reconstructing one or more video images in a video sequence using a computing device that implements a video decoder, the method comprising:
  at the computing device that implements the video decoder, receiving encoded data from a bit stream, wherein the encoded data includes entropy coded data for a macroblock of a video image, the entropy coded data for the macroblock being signaled in the bit stream as part of macroblock syntax at macroblock level, and the entropy coded data for the macroblock representing:
    (a) a terminal symbol indicating whether transform coefficient data for the macroblock is included in the bit stream;
    (b) intra/inter decision information indicating whether the macroblock is intra-coded or inter-coded, wherein the macroblock is inter-coded;
    (c) information indicating which of multiple reference frames is to be used in motion compensation for the inter-coded macroblock; and
    (d) motion information for the inter-coded macroblock; and
  with the computing device that implements the video decoder, decoding the macroblock using the encoded data from the bit stream, wherein the decoding the macroblock comprises:
    entropy decoding the entropy coded data for the macroblock to determine the terminal symbol, the intra/inter decision information, the information indicating which of the multiple references frames is to be used in motion compensation for the macroblock, and the motion information for the macroblock;
    determining whether transform coefficient data for the macroblock is included in the bit stream based at least in part upon the terminal symbol;
    reconstructing a motion vector for the macroblock using the motion information for the macroblock; and
    reconstructing the macroblock, including performing motion compensation for the macroblock using the motion vector and the indicated one of the multiple reference frames.

2. The method of claim 1 wherein the motion information represents plural values used to reconstruct a differential motion vector for the macroblock.

3. The method of claim 1 wherein the entropy decoding comprises Huffman decoding.

4. The method of claim 1 wherein the entropy decoding comprises arithmetic decoding.

5. The method of claim 1 wherein the macroblock is a current macroblock in the video image, the current macroblock is a one motion vector macroblock having a single motion vector, and wherein the decoding the current macroblock further comprises:
  computing a motion vector predictor for the current macroblock, including:
    calculating an initial predictor for the current macroblock based on one or more neighbor motion vector candidates of one or more neighboring macroblocks;
    comparing the initial predictor with at least one of the one or more neighbor motion vector candidates; and
    based at least in part on results of the comparing, selecting one of the one or more neighbor motion vector candidates as the motion vector predictor for the current macroblock;
  wherein the entropy coded data signaled in the bit stream as part of macroblock syntax at macroblock level for the current macroblock further includes a motion indicator for the current macroblock, and wherein the motion indicator indicates use of the selected one of the one or more neighbor motion vector candidates of the one or more neighboring macroblocks.

6. The method of claim 5 wherein the entropy coded data for the macroblock further represents the motion indicator with the terminal symbol, the intra/inter decision information, the information indicating which of multiple reference frames is to be used, and the motion information for the current macroblock.

7. A computing device that implements a video decoder, the computing device comprising one or more processing units and memory, the computing device being adapted to perform a method comprising:
  receiving encoded data from a bit stream, wherein the encoded data includes entropy coded data for a current macroblock of a video image, the entropy coded data for the current macroblock being signaled in the bit stream as part of macroblock syntax at macroblock level, and the entropy coded data for the current macroblock representing:
    (a) a terminal symbol indicating whether transform coefficient data for the current macroblock is included in the bit stream;
    (b) intra/inter decision information indicating whether the current macroblock is intra-coded or inter-coded, wherein the current macroblock is inter-coded and is a one motion vector macroblock having a single motion vector;
    (c) information indicating which of multiple reference frames is to be used in motion compensation for the current macroblock; and
    (d) motion information for the current macroblock; and
  decoding the current macroblock using the encoded data from the bit stream, wherein the decoding the current macroblock comprises:
    entropy decoding the entropy coded data for the current macroblock to determine the terminal symbol, the intra/inter decision information, the information indicating which of the multiple references frames is to be used, and the motion information for the current macroblock;
    determining whether transform coefficient data for the current macroblock is included in the bit stream based at least in part upon the terminal symbol;
    reconstructing the motion vector for the current macroblock using the motion information for the current macroblock; and
    reconstructing the current macroblock, including performing motion compensation for the current macroblock using the motion vector and the indicated one of the multiple reference frames.

8. The computing device of claim 7 wherein the motion information represents plural values used to reconstruct a differential motion vector for the macroblock.

9. The computing device of claim 7 wherein the entropy decoding comprises Huffman decoding.

10. The computing device of claim 7 wherein the entropy decoding comprises arithmetic decoding.

11. The computing device of claim 7 wherein the macroblock is a current macroblock in the video image, the current macroblock is a one motion vector macroblock having a single motion vector, and wherein the decoding the current macroblock further comprises:

computing a motion vector predictor for the current macroblock, including:
  calculating an initial predictor for the current macroblock based on one or more neighbor motion vector candidates of one or more neighboring macroblocks;
  comparing the initial predictor with at least one of the one or more neighbor motion vector candidates; and
  based at least in part on results of the comparing, selecting one of the one or more neighbor motion vector candidates as the motion vector predictor for the current macroblock;
  wherein the entropy coded data signaled in the bit stream as part of macroblock syntax at macroblock level for the current macroblock further includes a motion indicator for the current macroblock, and wherein the motion indicator indicates use of the selected one of the one or more neighbor motion vector candidates of the one or more neighboring macroblocks.

12. The computing device of claim 11 wherein the entropy coded data for the macroblock further represents the motion indicator with the terminal symbol, the intra/inter decision information, the information indicating which of multiple reference frames is to be used, and the motion information for the current macroblock.

13. The computing device of claim 7 wherein the motion information represents plural values used to reconstruct a differential motion vector for the current macroblock, and wherein the reconstructing the motion vector for the current macroblock comprises:
  computing a motion vector predictor for the current macroblock, including:
    calculating an initial predictor for the current macroblock based on one or more neighbor motion vector candidates of one or more neighboring macroblocks;
    comparing the initial predictor with at least one of the one or more neighbor motion vector candidates; and
    based at least in part on results of the comparing, selecting one of the one or more neighbor motion vector candidates as the motion vector predictor for the current macroblock, wherein the entropy coded data signaled in the bit stream as part of macroblock syntax at macroblock level for the current macroblock further includes a motion indicator for the current macroblock, and wherein the motion indicator indicates use of the selected one of the one or more neighbor motion vector candidates of the one or more neighboring macroblocks; and
  combining the differential motion vector with the motion vector predictor for the current macroblock.

14. The computing device of claim 7 further comprising a wireless communication connection, a display, and one or more speakers.

15. The computing device of claim 7 further comprising a display and a wireless communication connection, the bit stream being received over the wireless communication connection.

16. One or more tangible computer-readable storage media, wherein the one or more tangible computer-readable storage media are one or more of volatile memory, non-volatile memory, optical storage media, and magnetic storage media, storing computer-executable instructions for causing a computing device programmed thereby to perform a method of encoding one or more video images in a video sequence, the method comprising:
  performing motion estimation for a macroblock of a video image, wherein the motion estimation uses, at least in part, one of multiple reference frames, and wherein the motion estimation produces, at least in part, a motion vector;
  reconstructing the macroblock, including performing motion compensation for the macroblock using the motion vector and the indicated one of the multiple reference frames;
  determining, based at least in part upon the motion estimation and the motion compensation, data for the macroblock of the video image, the data for the macroblock representing:
    (a) a terminal symbol indicating whether transform coefficient data for the macroblock is included in a bit stream;
    (b) intra/inter decision information indicating whether the macroblock is intra-coded or inter-coded, wherein the macroblock is inter-coded;
    (c) information indicating the reference frame of the multiple reference frames used in motion compensation for the inter-coded macroblock; and
    (d) motion information for the inter-coded macroblock; and
  entropy encoding the data for the macroblock; and
  outputting, in the bit stream, the entropy encoded data for the macroblock, wherein the entropy encoded data for the macroblock is signaled in the bit stream as part of macroblock syntax at macroblock level.

17. The one or more computer-readable storage media of claim 16 wherein the motion information represents plural values used to reconstruct a differential motion vector for the macroblock.

18. The one or more computer-readable storage media of claim 16 wherein the entropy encoding comprises Huffman encoding.

19. The one or more computer-readable storage media of claim 16 wherein the entropy encoding comprises arithmetic encoding.

20. The one or more computer-readable storage media of claim 16 wherein the macroblock is a current macroblock in the video image, the current macroblock is a one motion vector macroblock having a single motion vector, and wherein the performing motion estimation for the current macroblock comprises:
  computing a motion vector predictor for the current macroblock, including:
    calculating an initial predictor for the current macroblock based on one or more neighbor motion vector candidates of one or more neighboring macroblocks;
    comparing the initial predictor with at least one of the one or more neighbor motion vector candidates; and
    based at least in part on results of the comparing, selecting one of the one or more neighbor motion vector candidates as the motion vector predictor for the current macroblock;
  wherein the entropy encoded data signaled in the bit stream as part of macroblock syntax at macroblock level for the current macroblock further includes a motion indicator for the current macroblock, and wherein the motion indicator indicates use of the selected one of the one or more neighbor motion vector candidates of the one or more neighboring macroblocks.

* * * * *